(12) United States Patent
Murayama

(10) Patent No.: US 11,907,592 B2
(45) Date of Patent: Feb. 20, 2024

(54) INFORMATION PROCESSING SYSTEM, INFORMATION PROCESSING APPARATUS, AND DISPLAY METHOD FOR DISPLAYING ERROR INFORMATION AND SOLUTION METHOD

(71) Applicant: Fumiya Murayama, Kanagawa (JP)

(72) Inventor: Fumiya Murayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/055,505

(22) Filed: Nov. 15, 2022

(65) Prior Publication Data

US 2023/0195391 A1 Jun. 22, 2023

(30) Foreign Application Priority Data

Dec. 20, 2021 (JP) .................................. 2021-206013
Aug. 24, 2022 (JP) .................................. 2022-133046

(51) Int. Cl.
*G06F 3/12* (2006.01)
*H04N 1/00* (2006.01)

(52) U.S. Cl.
CPC ............ *G06F 3/121* (2013.01); *G06F 3/1234* (2013.01); *H04N 1/00408* (2013.01)

(58) Field of Classification Search
CPC .... G06F 3/121; G06F 3/1234; G06F 11/0766; G06F 11/1024; G06F 11/327; H04N 1/00408; H04N 1/00344; H04N 7/0357; G05B 2219/33309; G05B 2219/25154; G05B 2219/14097; G05B 2219/36069; G05B 2219/33307; G07B 2017/00951; G07B 2017/00338; G11B 2020/148; G11C 2029/5604; G11C 29/42; G03G 2215/00548; G03G 2219/23404; G03G 2219/13189; G07F 7/084; H04L 1/0061; H04L 2012/6467; H03M 1/1052
See application file for complete search history.

(56) References Cited

U.S. PATENT DOCUMENTS

| | | | | |
|---|---|---|---|---|
| 2007/0100584 A1* | 5/2007 | August | ................. | G06Q 10/06 702/184 |
| 2009/0327814 A1 | 12/2009 | Watanabe | | |
| 2011/0150507 A1* | 6/2011 | Kim | .................... | G06F 11/0733 714/48 |
| 2014/0226176 A1* | 8/2014 | Iwakami | .............. | H04N 1/3263 358/1.14 |
| 2018/0007227 A1* | 1/2018 | Komaba | .............. | H04N 1/2129 |
| 2019/0073164 A1* | 3/2019 | Yamasaki | ............. | G06F 3/1256 |
| 2021/0112167 A1* | 4/2021 | Nagano | ............. | H04N 1/00039 |
| 2021/0311675 A1* | 10/2021 | Mahani | ................. | G06F 3/1208 |
| 2022/0417367 A1* | 12/2022 | Suzuki | .............. | H04N 1/00244 |

FOREIGN PATENT DOCUMENTS

| JP | 2008-269163 | 11/2008 |
|---|---|---|
| JP | 2019-209538 | 12/2019 |

* cited by examiner

*Primary Examiner* — Juan M Guillermety
(74) *Attorney, Agent, or Firm* — IPUSA, PLLC

(57) ABSTRACT

An information processing system, an information processing apparatus, and a display method. The information processing system stores in one or more memories, error information acquired from the device and a solution method of an error input to the device or the information processing apparatus in association with time information and displays on a display, presence of the error information and presence of the solution method in association with time axis based on the time information.

15 Claims, 20 Drawing Sheets

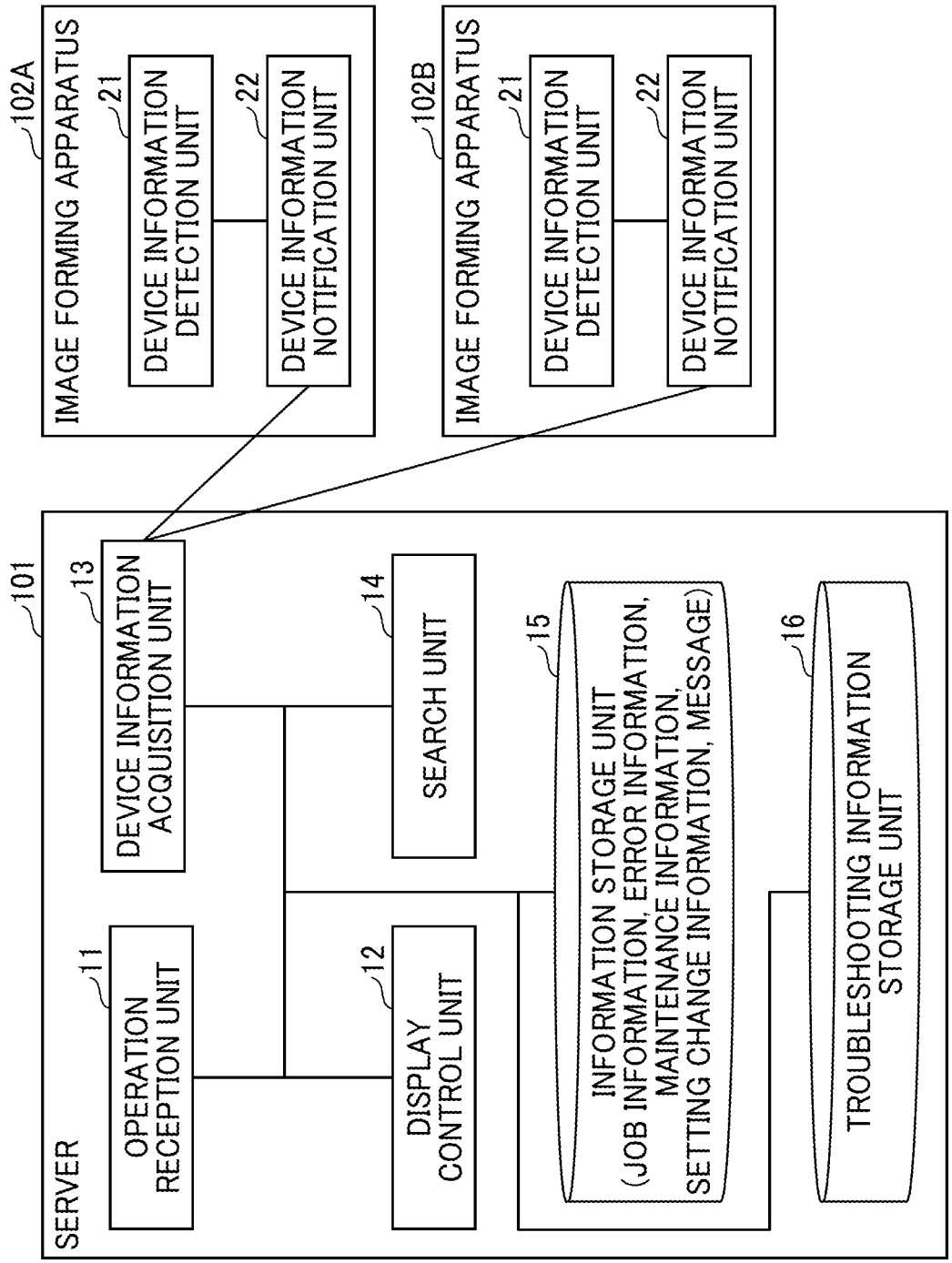

FIG. 14

| JAM CODE | COUNTERMEASURE INFORMATION | DETAILS |
|---|---|---|
| JAM001 | PAPER JAMMED AT XXX. PLEASE REMOVE FROM YYY. | HTTP://SAMPLE.COM/JAM/001.HTML |
| JAM002 | PAPER JAMMED AT AAA. PLEASE REMOVE FROM BBB. | HTTP://SAMPLE.COM/JAM/002.HTML |
| ... | ... | ... |
| JAM098 | ·PLEASE CHECK WHETHER PAPER SETTING IS MATCHING WITH ACTUAL PAPER.<br>·PLEASE CHECK MAINTE-NANCE STATUS. | HTTP://SAMPLE.COM/JAM/098-2.HTML<br>HTTP://SAMPLE.COM/JAM/098-1.HTML |
| ... | ... | ... |

FIG. 15

| JOB ID | FILE NAME | PAPER SIZE | COLOR/MONO-CHROME | PAPER TRAY | ONE-SIDED/TWO-SIDED | COMBINED PRINT | TIME |
|---|---|---|---|---|---|---|---|
| 001 | SAMPLE1.PDF | A4 | MONO-CHROME | TRAY 1 | TWO-SIDED | NO | MM/DD/20XX 9:00-10:00 |
| 002 | SAMPLE2.PDF | A4 | COLOR | TRAY 1 | ONE-SIDED | 2in1 | MM/DD/20XX 12:00-12:30 |
| 003 | SAMPLE3.PDF | A3 | COLOR | TRAY 2 | ONE-SIDED | NO | MM/DD/20XX 13:00-14:00 |
| 004 | SAMPLE4.PDF | A4 | MONO-CHROME | TRAY 1 | TWO-SIDED | 2in1 | MM/DD/20XX 15:00-15:10 |
| ... | ... | ... | ... | ... | ... | ... | ... |

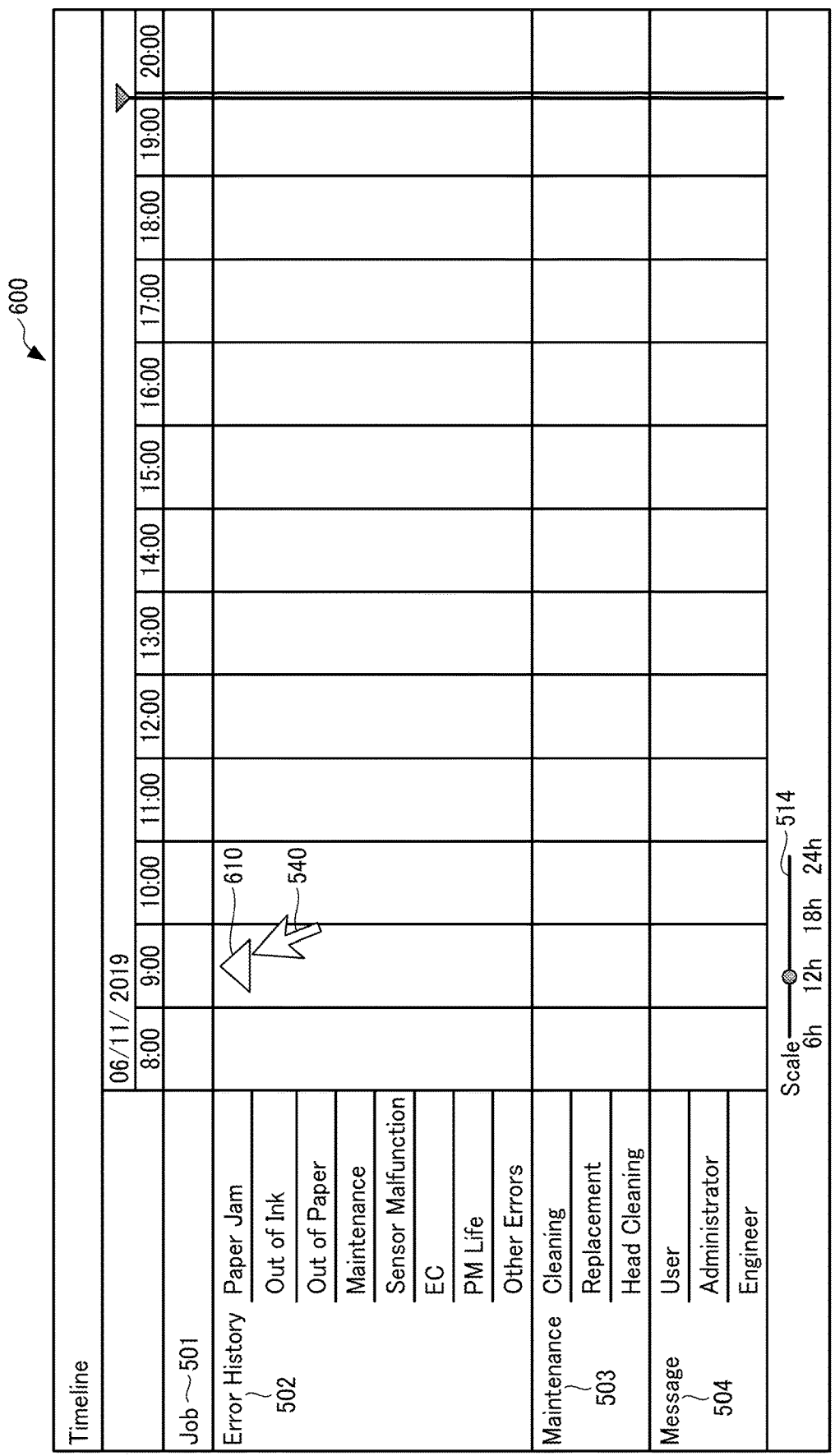

FIG. 20

| Timeline | | Customize Display | Output File | | | | Designate Display Date and Time | | | | Present | Display Period |
|---|---|---|---|---|---|---|---|---|---|---|---|---|
| | | 601 | 602 | 603 604 | | | 605 | | 606 | | 607 | |
| Job ~ 501 | | MM/DD/20XX | | | | | | | | | | |
| | | 8:00 | 9:00 | 10:00 | 11:00 | 12:00 | 13:00 | 14:00 | 15:00 | 16:00 | 17:00 | 18:00 | 19:00 | 20:00 |
| Error History 502 | Paper Jam | | | | ▲ 631 | | | | | | | | |
| | Out of Ink | | ● | | | ● | | | ● | | | | |
| | Out of Paper | | | | ▢ | | | | | | | | |
| | Maintenance | | | | | | | | | | | | |
| | Sensor Malfunction | | | | | ▲ | | | ▲ | | | | |
| | EC | | | | ◁ | | | | | | | | |
| | PM Life | | | | | | | | | | | | |
| | Other Errors | | | | | ▮ | | | | | | | |
| Maintenance 503 | Cleaning | | | | | | | | | | | | |
| | Replacement | | | ▭ | | | | | | | | | |
| | Head Cleaning | | | | | | | | | ▭ | | | |
| Message 504 | User | | | | | | | | | | | | |
| | Administrator | | | | | ▬ | | | | | | | |
| | Engineer | | | | | | | | | | | | |

630 →

632 →

Type: Jam
Time: 11:10:00
Operator: AAA
Location: Paper Feed
Name of Paper: aaa
Type of Paper: Plain Paper Register Comment Related Information

635

636 — Right Drawer Unit Insufficient Cleaning

Scale — 514
6h  12h  18h  24h

ND DISPLAY METHOD FOR DISPLAYING
INFORMATION PROCESSING SYSTEM, INFORMATION PROCESSING APPARATUS, AND DISPLAY METHOD FOR DISPLAYING ERROR INFORMATION AND SOLUTION METHOD

CROSS-REFERENCE TO RELATED APPLICATIONS

This patent application is based on and claims priority pursuant to 35 U.S.C. § 119(a) to Japanese Patent Applications No. 2021-206013, filed on Dec. 20, 2021, and No. 2022-133046, filed on Aug. 24, 2022, in the Japan Patent Office, the entire disclosure of which is hereby incorporated by reference herein.

BACKGROUND

Technical Field

The present disclosure relates to an information processing system, an information processing apparatus, and a display method.

Background Art

In devices such as image forming apparatuses, motors, clutches, and the like execute mechanical operations to print with color materials, and therefore various types of maintenance such as cleaning and parts replacement may be performed. In addition, when an error such as a paper jam occurs in the device, corrective work is performed to eliminate the error.

SUMMARY

Embodiments of the present disclosure describe an information processing system, an information processing apparatus, and a display method. The information processing system stores in one or more memories, error information acquired from the device and a solution method of an error input to the device or the information processing apparatus in association with time information and displays on a display, presence of the error information and presence of the solution method in association with time axis based on the time information.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 13 is a block diagram illustrating an example of the functional configuration of the server and the image forming apparatus;

FIG. 14 is a table illustrating an example of troubleshooting information stored in a troubleshooting information storage unit;

FIG. 15 is a table illustrating an example of job information stored in an information storage unit;

FIGS. 17A and 17B are diagrams illustrating an example of the timeline screen in which an icon is displayed at the center;

FIG. 20 is a diagram illustrating an example of detailed information and a solution method displayed on the timeline screen;

Figure 1:
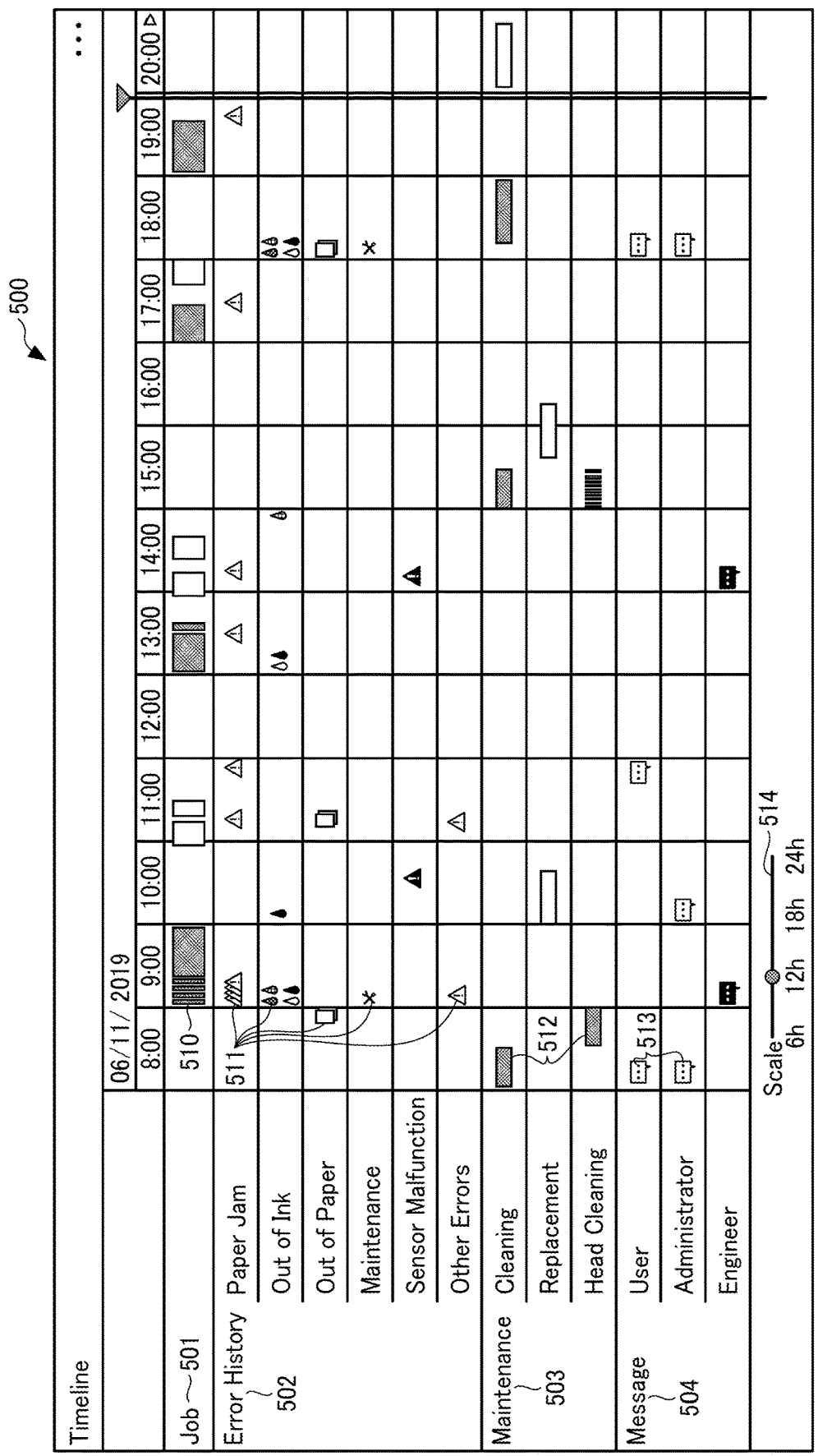
FIG. 1 is a diagram illustrating an example of a timeline screen in which a job, error information, maintenance information, and a message are displayed on one screen.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, as an example of embodiment for carrying out the present disclosure, an information processing system and a display method performed by the information processing system is described.

In the present embodiment, a server displays a plurality of pieces of information such as a past job, error information, maintenance information, a setting change, and a message on one screen in chronological order. In addition, past errors of the same type as an error that occurred is displayed with a simple operation, and the job, the maintenance information, the setting change, and the message related to the past error information is also displayed.

FIG. 1 is a diagram illustrating an example of a timeline screen 500 in which the job, the error information, the maintenance information, and the message are displayed on one screen. As illustrated in FIG. 1, the timeline screen 500 includes a job row 501, an error history row 502, a maintenance row 503, and a message row 504 arranged vertically, and a time zone (time axis) arranged horizontally. In the job row 501, the error history row 502, the maintenance row 503, and the message row 504, various display objects (display components and icons) indicating presence of the information are displayed in association with time.

In the job row 501, the job executed by an image forming apparatus 102 in the past are displayed with a rectangular mark 510 indicating that the job is executed and a time period indicating how long the job took.

The error history row 502 is further divided into error types (paper jam, out of ink, out of paper, maintenance, sensor malfunction, other errors), and an error icon 511 indicating the presence of the error and the time when the error occurred is displayed.

The maintenance row 503 is further divided into maintenance types (cleaning, replacement, head cleaning), and a bar 512 indicating the presence of maintenance information and the maintenance type is displayed at the time when the corresponding maintenance is performed.

The message row 504 is further divided into operator (user, administrator, engineer) who entered the message, and a message mark 513 indicating that the message is present, at the time of occurrence of the error or the time the operator entered the message. The operator enters a solution method of the error in the message.

A display period setting scale 514 is displayed at the bottom of the timeline screen. The operator sets the time range displayed on one screen.

As illustrated in FIG. 1, when the error icon 511 indicating the error is displayed, the message mark 513 indicating that the message is present is displayed at the same time or within a predetermined period of time after the error. Since the error and the solution method are displayed in association with each other as described above, finding the solution method for the error becomes easier for the operator, and the time from the occurrence of a new error to the solution of the error is shortened.

Figure 2:
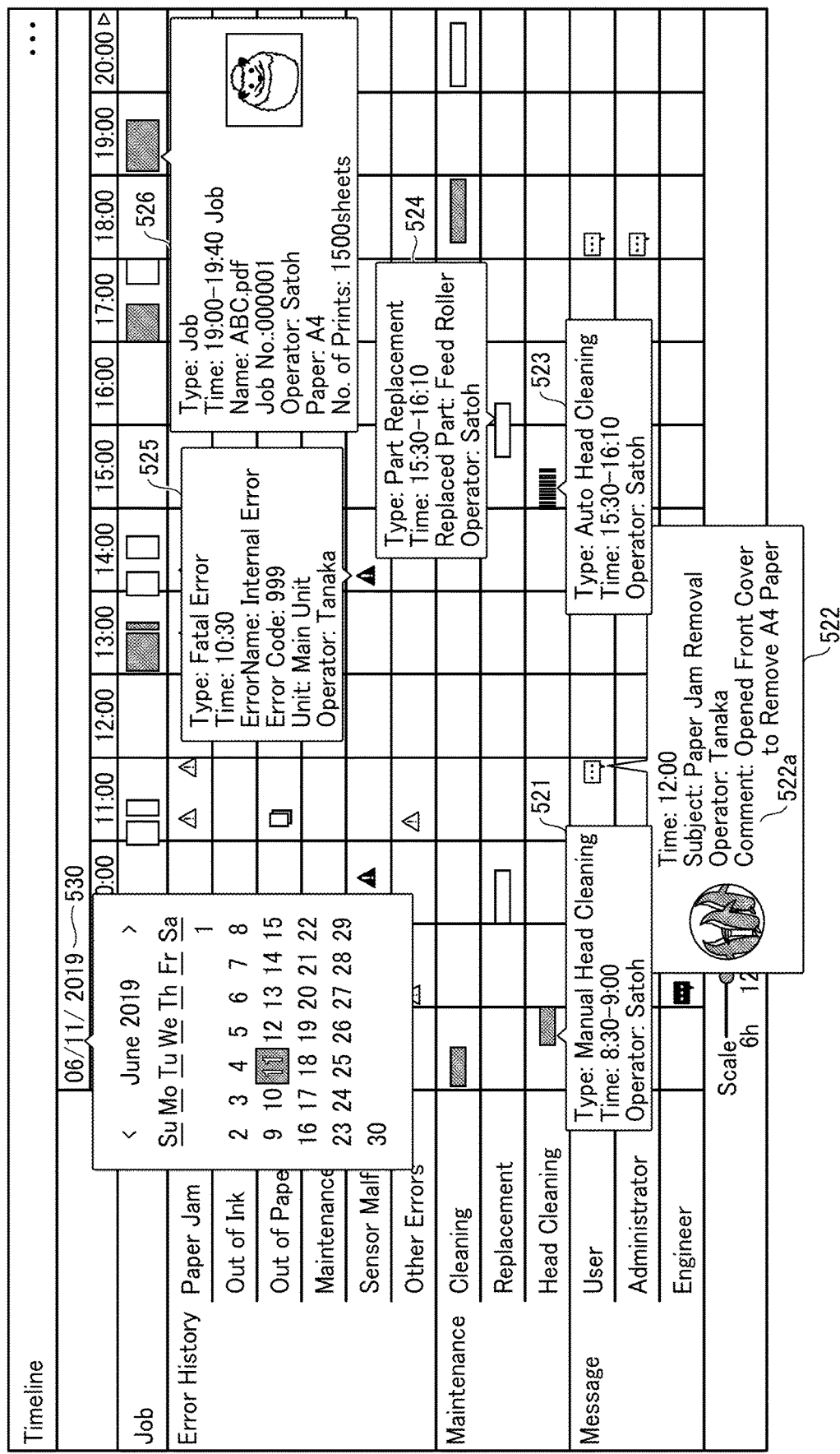
FIG. 2 is a diagram illustrating an example of the timeline screen including a pop-up display presenting detailed information.

As illustrated in FIG. 2, in response to a pressing of a display object (the rectangular mark 510, the error icon 511, the bar 512, the message mark 513) by the operator, detailed information 521 to 526 are popped up. The display object may be displayed by mouse over instead of pressing. FIG. 2 is an example of the timeline screen 500 including a pop-up display presenting detailed information.

In response to a pressing of the rectangular mark 510, detailed information 526 indicating type, time, job name, job No., operator name, paper name, and number of prints are displayed.

In response to a pressing of the error icon 511, detailed information 525 indicating the type, time, error name, error code, generating unit, and operator name is displayed.

In response to a pressing of the bar 512, detailed information 524 indicating the type, time, replacement part name, and operator name is displayed.

In response to a pressing of the message mark 513, detailed information 521 and 523 indicating the type, time, and operator name are displayed, and detailed information 522 including a comment 522a is displayed in the case text data is input. The text data of the comment 522a is the body of the message. The message mark 513 may be displayed differently depending on whether text data has been input in comment 522a. The operator inputs text data on how the error is solved. In addition to the text data, images, voices, and the like may be input. For example, the following solution method may be entered for a paper jam.

"A paper jam occurred at an exit of image forming unit. A cover near the exit was opened and the jammed paper was removed. See http:// . . . or the manual link for how to remove the paper jam."

In response to a pressing of a date 530, the timeline for that day is displayed on the timeline screen 500.

In FIGS. 1 and 2, the displayed objects are black and white due to drawing limitations, but the display objects may be colored, shaped, and sized so that the contents of jobs, errors, maintenance, and messages are easy to recognize on the display.

The operator is able to find out how to solve the error by scrolling the timeline screen 500 in the past direction or by switching discontinuously to search for the same error icon 511 in the past, and pressing the message mark 513 near the error icon 511. In the case the message mark 513 contains the solution method of the error, the operator is able to find out how to solve the error that has occurred.

On the timeline screen, the past error of the same type and the message as well as job information and the maintenance information are displayed in association with the time. Related information such as the cause of the error (information displayed as a list on the content screen) is also presented simply and collectively.

Also, in the present embodiment, in response to an occurrence of the error, the operator presses the error icon 511 of the newly occurred error to find out the solution to the error. The server described below searches for the error of the same type (past error with a message within the predetermined period of time after the error) and scrolls the error icon 511 of the error to the center of the timeline screen 500, or switches the display without scrolling. Since the message mark 513 near the error icon 511 contains the solution method of the error, the operator is able to know how to solve the error that has occurred.

The job is an operation performed by the device, and the job of the image forming apparatus is printing of an instructed number of sheets. The job information is information indicating the contents of the job (information displayed as illustrated in FIG. 2).

The error is any malfunction that occurs in the device. The errors include errors that make printing impossible, errors that fail to meet standards for printed matter quality, and the like. The error information is information indicating the content of the error (information displayed as illustrated in FIG. 2).

The maintenance is retention, management, and upkeep of a machine and a structure, or work associated with the maintenance. The maintenance information is information indicating the content of the maintenance (information displayed as illustrated in FIG. 2).

The message may be any information that has some meaning. In the present embodiment, the message includes the solution method of the error (information displayed as illustrated in FIG. 2).

The setting change indicates that the operator changed the settings (firmware update, backup or restore, defective nozzle diagnosis and correction, and the like) related to the operation of the device. The setting change information is information indicating the content of the setting change.

Figure 3:
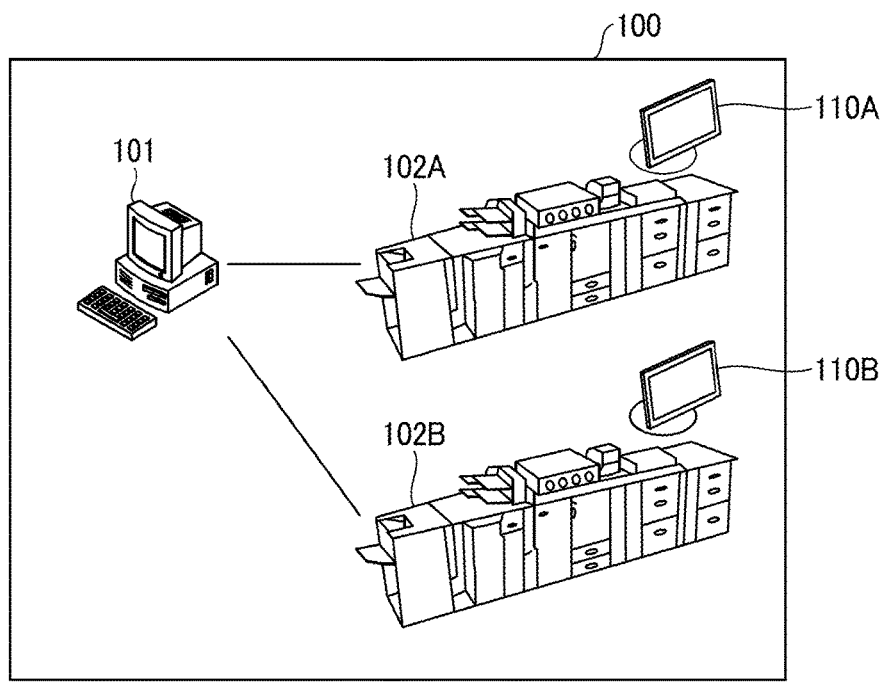
FIG. 3 is a diagram illustrating an example of a system configuration of an information processing system.

FIG. 3 is a diagram illustrating an example of a system configuration of the information processing system 100. The information processing system 100 includes the server 101 and a plurality of image forming apparatuses 102A and 102B. Note that FIG. 3 omits a digital front end (DFE) generally included in a commercial printing system, a terminal device operated by the operator, and the like.

The server 101 is one or more information processing apparatuses. The server 101 communicates with the plurality of image forming apparatuses 102A and 102B through a network, acquires information stored in the image forming apparatuses 102A and 102B, and displays the information on displays 110A and 110B. In addition, the server 101 stores the job information, the error information, the maintenance information, the setting change information, and the error solution messages acquired from the image forming apparatuses 102A and 102B in association with the time information. The number of image forming apparatuses and displays illustrated in the figure is an example.

An image forming apparatus among the plurality of image forming apparatuses 102A and 102B is hereinafter referred to as an "image forming apparatus 102", and a display among the plurality of displays 110A and 110B is referred to as a "display 110".

The server 101 may be a web server (user interface (UI) server) that performs processing related to displaying the screen. For example, the function of the server 101 may be installed in any image forming apparatus 102.

For example, server software called Tomcat, is installed in the server 101. The server 101 is a server that provides screen information (HyperText Markup Language (HTML), Cascading Style Sheets (CSS), TypeScript) such as the timeline screen and a maintenance schedule as a web application.

The image forming apparatus 102 transmits information displayed on the timeline screen to the server 101. A web browser included in the image forming apparatus 102 acquires screen information of the timeline screen from the server 101 and displays the timeline screen and other various screens on the display 110 included in the image forming apparatus 102. The various screens are displayed by accessing the server 101 through the web browser that operates on a terminal device such as a personal computer (PC) operated by the operator.

The server 101 also displays the timeline screen 500 provided that a keyboard and the display are connected to the server 101.

The image forming apparatus 102 may include the server 101 (server function). The image forming apparatus 102 includes the server 101 by implementing the server function and the web browser with a controller (such as a computer) of the image forming apparatus 102. The information displayed on the timeline screen is acquired by the server function through the controller and updated in real time.

Figure 4:
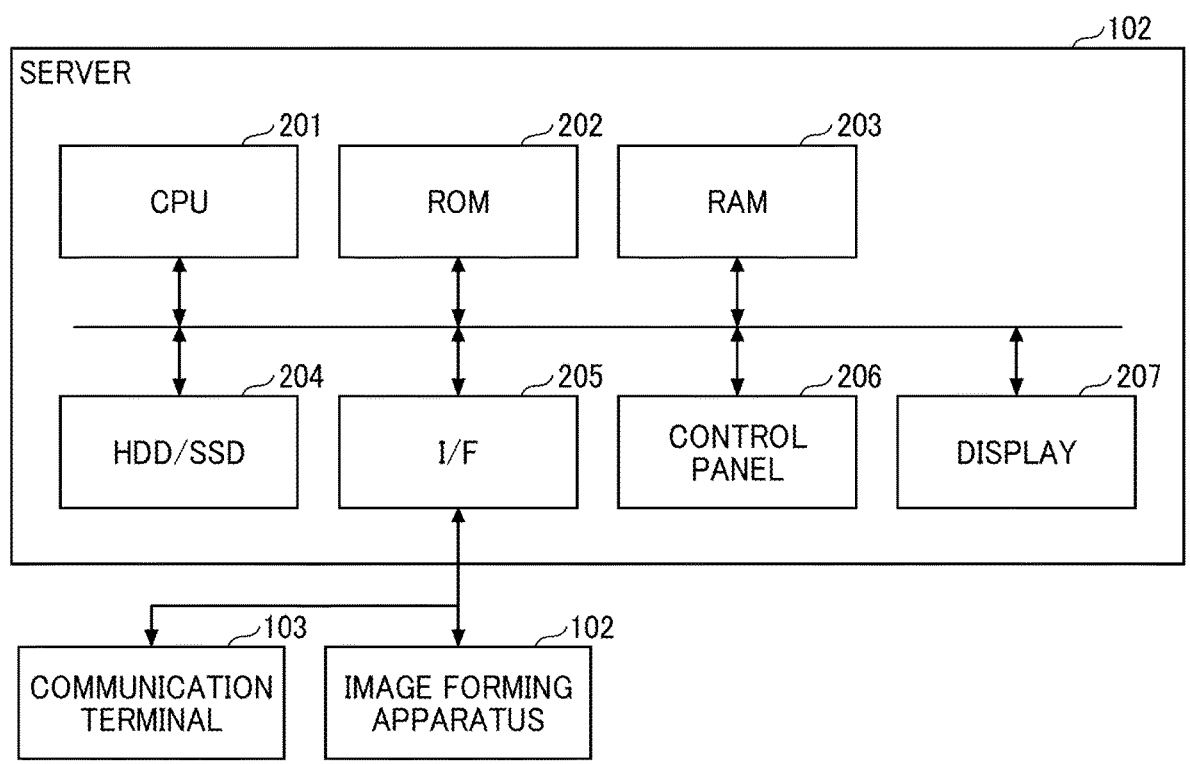
FIG. 4 is a block diagram illustrating an example of a hardware configuration of a server.

FIG. 4 is a block diagram illustrating an example of a hardware configuration of the server 101. The server 101 has a configuration similar to that of the computer. The server 101 includes a central processing unit (CPU) 201, a read only memory (ROM) 202, a random access memory (RAM) 203, a hard disk drive/solid state drive (HDD/SSD) 204, an interface (I/F) 205, a control panel 206 and a display 207.

The CPU 201 uses the RAM 203 as a work area to execute a program stored in the ROM 202.

The HDD/SSD 204 is used as a storage unit and stores information displayed on the timeline screen and the maintenance schedule information. Information stored in the HDD/SSD 204 may be used by the CPU 201 when executing a read program. The I/F 205 is an interface for communicating with the image forming apparatus 102 and the terminal device 103.

The control panel 206 includes a touch panel and a keyboard, and displays the state of the image forming apparatus 102, the timeline screen, the maintenance schedule, and the like on the display 207. Further, the control panel 206 receives input from the operator.

Figure 5:
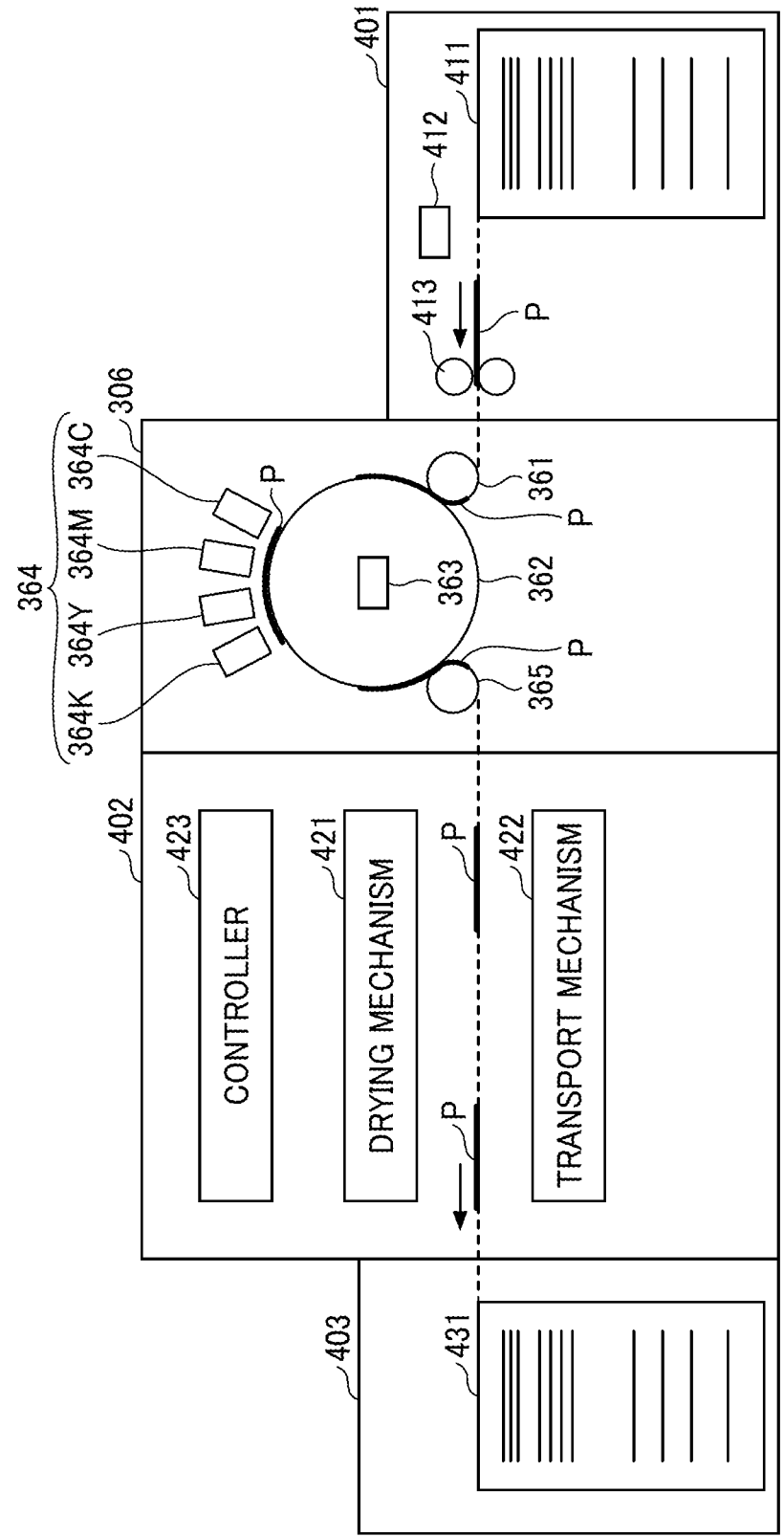
FIG. 5 is a schematic diagram illustrating an outline of a configuration of an image forming apparatus.

FIG. 5 is a schematic diagram illustrating an outline of a configuration of the image forming apparatus 102 according to the present embodiment. The image forming apparatus 102 is, for example, an inkjet image forming apparatus 102, and includes a paper feeding unit 401, an image forming unit 306, a drying unit 402, a paper ejection unit 403, and a controller 423. The image forming apparatus 102 forms an image in the image forming unit 306 with ink, which is a liquid for image formation, on paper P, which is a recording material as a sheet material fed from the paper feeding unit 401. Then, the image forming apparatus 102 dries the ink adhered to the paper in the drying unit 402 and then ejects the paper from the paper ejection unit 403.

The paper feeding unit 401 includes a paper feeding tray 411 on which a plurality of sheets of paper P are stacked, a feeding device 412 that separates and feeds the sheets of paper one by one from the paper feeding tray 411, and a pair of registration rollers 413 for feeding the paper to the image forming unit 306. In one example, the feeding device 412 uses rollers. In another example, the feeding device 412 uses air suction. After the leading edge of the paper fed from the paper feeding tray 411 by the feeding device 412 reaches the pair of registration rollers 413, the pair of registration rollers 413 is driven at a predetermined timing to feed the paper to the image forming unit 306. In the present embodiment, the configuration of the paper feeding unit 401 is not limited as long as the paper feeding unit 401 feeds the paper P to the image forming unit 306.

The image forming unit 306 includes a receiving cylinder 361 for receiving the fed paper P, a paper carrier drum 362 for carrying and transporting on outer peripheral surface0 the paper P transported by the receiving cylinder 361, an ink ejection unit 364 for ejecting ink toward the paper P carried by the paper carrier drum 362, and a transfer cylinder 365 for transferring the paper P transported by the paper carrier drum 362 to the drying unit 402. A leading edge of the paper P transported from the paper feeding unit 401 to the image forming unit 306 is gripped by a paper gripper provided on the surface of the receiving cylinder 361 and transported as the surface of the receiving cylinder 361 moves. The paper transported by the receiving cylinder 361 is transferred to the paper carrier drum 362 at a position facing the paper carrier drum 362.

The paper gripper is also provided on the surface of the paper carrier drum 362, and the leading edge of the paper is gripped by the paper gripper. In addition, a plurality of suction holes are dispersedly formed on the surface of the paper carrier drum 362, and a suction device 363 generates a sucking air current toward the inside of the paper carrier drum 362 in each of the suction holes. The paper P transferred from the receiving cylinder 361 to the paper carrier drum 362 is gripped by the paper gripper at the leading edge, attracted to the surface of the paper carrier drum 362 by the suction air current, and transported as the surface of the paper carrier drum 362 moves.

The ink ejection unit 364 of the present embodiment ejects four colors of ink, cyan (C), magenta (M), yellow (Y), and black (K), to form an image and separate liquid ejection heads 364C, 364M, 364Y, and 364K are provided for each ink. The liquid ejection heads 364C, 364M, 364Y, and 364K are not limited in configuration and as long as liquid is ejected any configuration can be adopted. The ink ejection unit 364 may be provided with the liquid ejection head that ejects special ink such as white, gold, or silver, or the liquid ejection head that ejects liquid that does not form an image, such as a surface coating liquid.

The ejection operations of the liquid ejection heads 364C, 364M, 364Y, and 364K of the ink ejection unit 364 are controlled by drive signals corresponding to image data. The liquid ejection heads 364C, 364M, 364Y, and 364K eject inks of different colors on the paper P transported on the paper carrier drum 362 passing through the area facing the ink ejection unit 364, and an image corresponding to the image data is formed. In the present embodiment, configuration of the image forming unit 306 is not limited as long as the image forming unit 306 forms the image by depositing liquid on the paper P.

The drying unit 402 includes a drying mechanism 421 for drying ink adhered to the paper P in the image forming unit 306, and a transport mechanism 422 for transporting the paper P transported from the image forming unit 306. The paper P transported from the image forming unit 306 is received by the transport mechanism 422, transported so as to pass through the drying mechanism 421, and delivered to the paper ejection unit 403. The ink on the paper P is subjected to a drying process while passing through the drying mechanism 421, whereby liquid such as moisture in the ink evaporates, the ink adheres to the paper P, and curling of the paper P is restricted.

The paper ejection unit 403 includes a paper output tray 431 on which a plurality of sheets of paper P is stacked. The paper P transported from the drying unit 402 are sequentially stacked and held on the paper output tray 431. Note that, in the present embodiment, the configuration of the paper ejection unit 403 is not limited as long as the paper ejection unit 403 discharges the paper P.

The controller 423 is an information processing apparatus for controlling the image forming apparatus 102. The controller 423 includes, for example, a CPU, RAM, ROM, SSD (HDD), communication device, and the like. The controller 423 communicates with the server 101 to transmit information to be displayed on the timeline screen.

Figure 6:
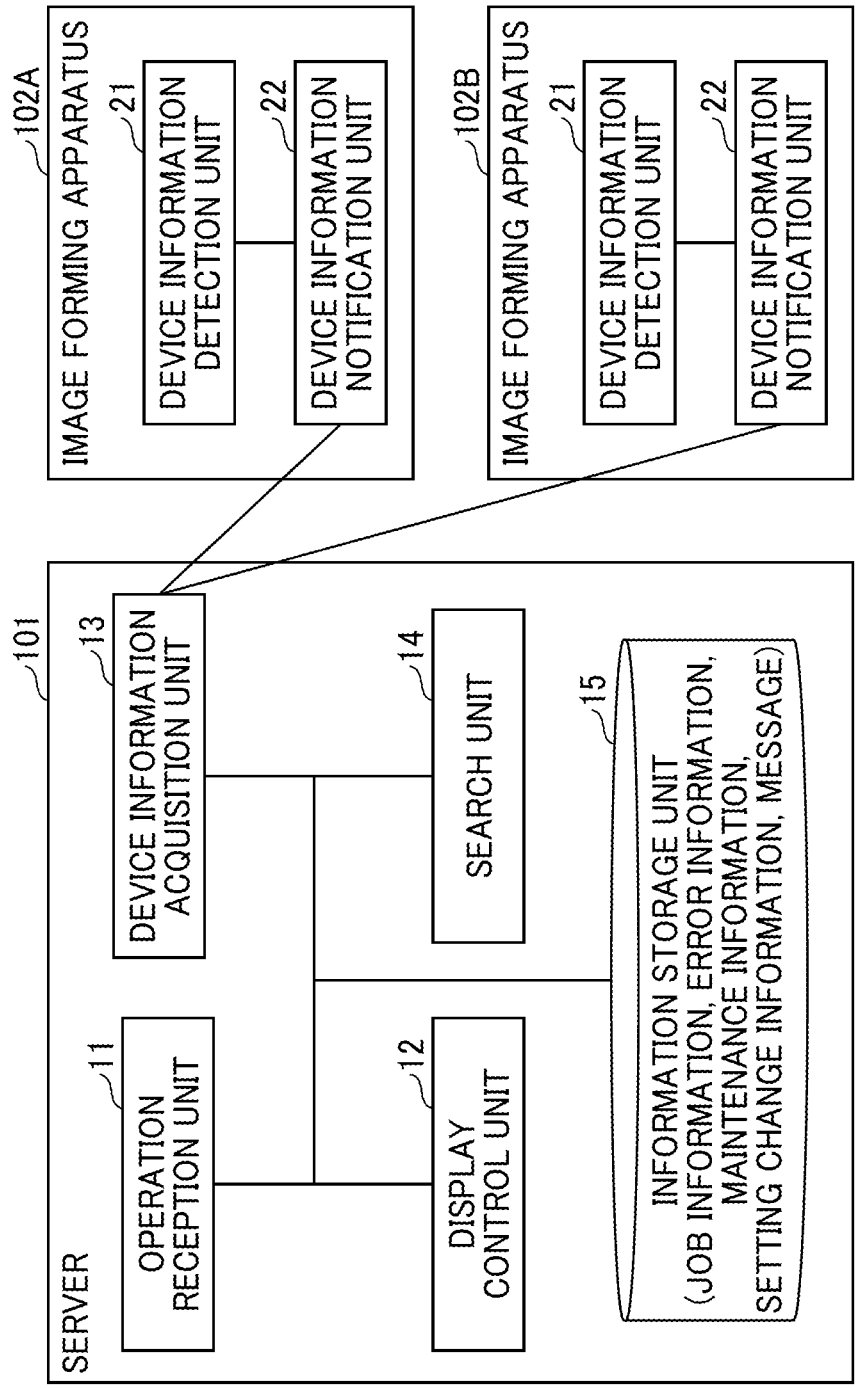
FIG. 6 is a block diagram illustrating a functional configuration of the server and the image forming apparatus.

FIG. 6 is a block diagram illustrating a functional configuration of the server 101 and the image forming apparatuses 102A and 102B. As illustrated in FIG. 6, the server 101 includes an operation reception unit 11, a display control unit 12, a device information acquisition unit 13, a search unit 14 and an information storage unit 15. These units included in the server 101 are functions implemented by operating any of the hardware elements illustrated in FIG. 4 in cooperation with the instructions of the CPU 201 according to the control program expanded from the HDD/SSD 204 to the RAM 203.

The information storage unit 15 is implemented by the HDD/SSD 204 and RAM 203 illustrated in FIG. 4. However, the information storage unit 15 is not limited to being included in the server 101, and may be on a network that the server 101 is connected to.

Information stored in the information storage unit 15 is described in the following. The information storage unit 15 stores the job information, the error information, the maintenance information, the setting change information, and the message as presented in Tables 1 to 5 as an example.

TABLE 1

Job Information

| Type | Time | Job Name | Job No. | Operator | Paper Name | No. of Prints |
|---|---|---|---|---|---|---|
| Job | 13.00-14:40 | ABC.pdf | J001 | Mick | A4 | 100 |
| — | — | — | — | — | — | — |

TABLE 2

Error Information

| Type | Time | Error Name | Error Code | Unit | Operator |
|---|---|---|---|---|---|
| Fatal Error | 10:30 | Internal Error | 998 | Main Unit | Keith |
| — | — | — | — | — | — |

TABLE 3

Maintenance Information

| Type | Time | Operator |
|---|---|---|
| Manual Head Cleaning | 15:00-16:00 | Ron |
| — | — | — |

TABLE 4

Setting Change Information

| Type | Time | Operator |
|---|---|---|
| Firmware Update | 21:00 | Bill |
| — | — | — |

TABLE 5

Message

| Time | Subject | Operator | Comment |
|---|---|---|---|
| 11:00 | Internal Error | Charlie | Completed |
| — | — | — | — |

The job information is information in which the start, continuation, and end of the printing operation are stored in association with time. The job information is notified from the controller 423 of the image forming apparatus 102.

The error information is information in which paper jam, paper shortage, failure in the device, occurrence of part replacement, etc. are stored in association with time. The error information is notified from the controller 423 of the image forming apparatus 102.

The maintenance information is information in which task information such as cleaning work in the image forming apparatus, part replacement, and device control is associated with time and stored as a schedule. The maintenance information also includes the result of executing the task schedule. The maintenance information (task schedule, task execution result) is stored in the server 101 or registered in advance by the operator in a scheduler (calendar function) on the network. On a scheduled time to perform maintenance, the operator presses an execution button associated with a subdivided maintenance task. The server 101 acquires the maintenance information of the pressed (selected) task from the scheduler. Note that the scheduler (calendar function) may be one of the applications similar to the timeline installed in the server 101. Alternatively, the scheduler may be provided by another server on the network or by a cloud service.

The setting change information includes firmware update, backup or restore, and faulty nozzle diagnosis and correction. When the operator performs the corresponding operation, the time, execution result, state before execution, etc. are recorded as the setting change information. Alternatively, the image forming apparatus 102 may detect the setting change made by the operator, and the controller 423 may notify the server 101 of the change.

The message is information entered by the operator on the timeline screen. For example, the operator enters the message (how to solve the error, cause of the error, contact information for consultation, etc.) at a time near the error. The message may not be input at the time the error was actually solved. The web browser displayed on the display 110 of the image forming apparatus 102 receives input of the message. Alternatively, the operator may input the message using, for example, the web browser of the terminal device.

The device information acquisition unit 13 acquires the job information, error information, maintenance information, and setting change information from the image forming apparatus 102. The message may be input to the server 101 by the operator, and the setting change information may also be input to the server 101 by the operator.

The search unit 14 searches the error information in the information storage unit 15 for the error of the same type as the error that occurred. Since the time information is associated with the error information that matched the search, the message input close to this time information is also identified. Therefore, the search unit 14 can automatically extract the optimum error solution method. Note that the search unit 14 also executes a process for acquiring the job information, error information, maintenance information, setting change information, and message from the information storage unit 15.

The display control unit 12 displays display objects (display components and icons) such as the rectangular mark 510, the error icon 511, the bar 512, and the message mark 513 (presence of job information, presence of error information, presence of maintenance information, presence of setting change information, presence of message) on the timeline screen 500 as a list. To display the errors of a plurality of image forming apparatuses 102, the display control unit 12 creates a plurality of tabs corresponding to the respective image forming apparatuses 102, and switches the tabs according to operation by the operator.

The display control unit 12 displays the rectangular mark 510 to indicate the presence of the job information, in different colors for each mode (job type, mode, paper type, presence or absence of special color specifications, borderless, etc.) for the jobs of one image forming apparatus 102. The color may be configurable by the operator.

The display control unit 12 changes a shape of the error icon 511 to indicate the presence of error information, according to the contents of the error (paper jam, out of ink, out of paper, maintenance, sensor malfunction, other errors). The display control unit 12 changes the color, shape, and size of the error icon 511 according to a degree of the error and ink color related to the error, for the error that has the same content.

In addition, when the display control unit 12 displays the presence of maintenance information with the bar 512, the color is changed for each maintenance content (cleaning, replacement, head cleaning).

In addition, when displaying the message mark 513 to indicate the presence of the message, the display control unit 12 changes the color or the like according to the presence or absence of the solution method (text data). The operator may set a degree of importance for the message, and the color and the like of the message mark 513 may be changed according to the degree of importance.

On the timeline screen 500, these pieces of information are arranged in association with the time zones on the horizontal axis based on the associated time information. The operator can designate the date, time, etc. within the range stored in the information storage unit 15, and retroactively display the information.

Note that FIGS. 1 and 2 illustrate the information of one image forming apparatus 102 corresponding to a tab switched by the operator. The display control unit 12 may display the rectangular mark 510, the error icon 511, the bar 512, and the message mark 513 of a plurality of image forming apparatuses 102 within one screen. In this case, the display control unit 12 displays the rectangular mark 510, the error icon 511, the bar 512 and the message mark 513 in the same system color for each image forming apparatus 102. As a result, a sense of uniformity is generated for each image forming apparatus, and the operator can easily view information regarding the same image forming apparatus.

The image forming apparatus 102 includes a device information detection unit 21 and a device information notification unit 22. Each of these functions of the image forming apparatus 102 is a function implemented by the CPU executing instructions according to a program in the controller 423.

The device information detection unit 21 detects the job executed by the image forming apparatus 102, the error that occurred, the change in the setting, and the maintenance information that has been set.

The device information notification unit 22 notifies the server 101 of the job information about the job detected by the image forming apparatus 102, the error information about the error, the maintenance information, and the setting change information. The device information notification unit 22 does not notify the above information in the case the image forming apparatus 102 is integrated with the server 101.

Figure 7:
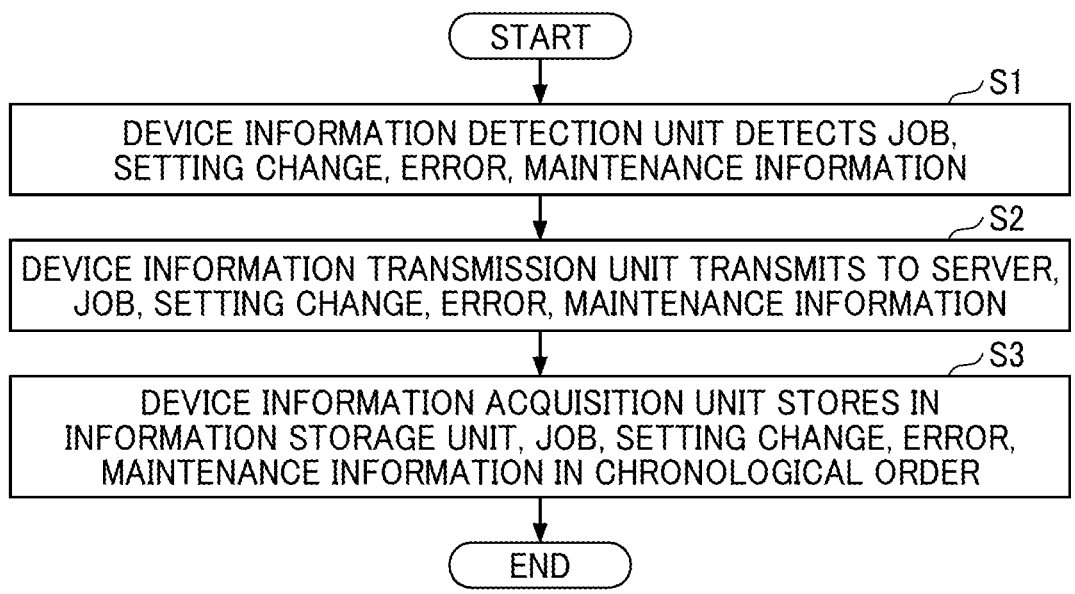
FIG. 7 is a flowchart illustrating an example of a process of detecting job information, the error information, setting change information, and maintenance information executed by the image forming apparatus and a process of storing the information executed by the server.
Figure 8:
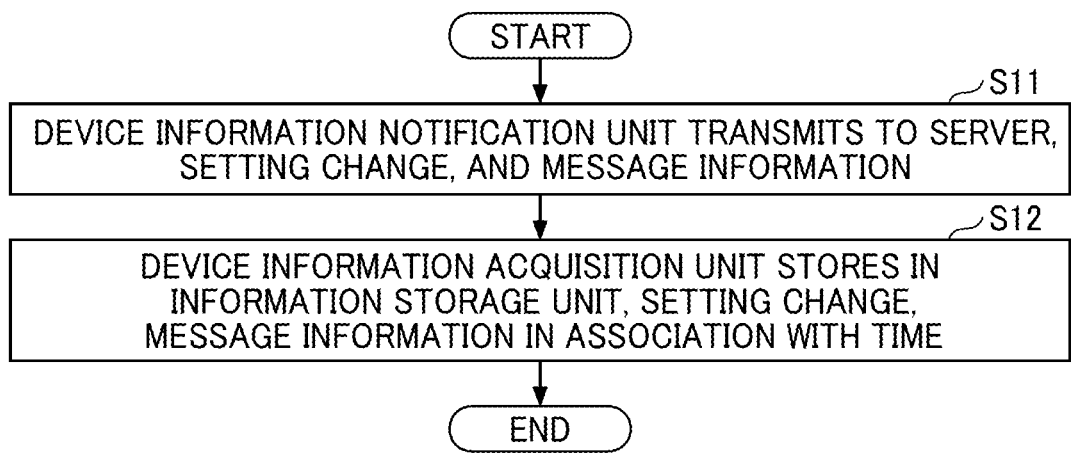
FIG. 8 is a flowchart illustrating an example of a process of detecting the setting change information and the message executed by the image forming apparatus and a process of storing the information executed by the server.

With reference to FIGS. 7 and 8, methods of detecting and storing the job information, the error information, the maintenance information, the setting change information, and the message are described.

FIG. 7 is a flowchart illustrating an example of a process of detecting the job information, the error information, the setting change information, and the maintenance information executed by the image forming apparatus 102 and a process of storing the information executed by the server 101.

In step S1, the device information detection unit 21 detects the job executed by the image forming apparatus 102, the error that occurred, the setting change, and the set maintenance information. The maintenance information may be obtained by referring to the maintenance execution result stored in the scheduler, or may be obtained by detecting replacement of specific part in the apparatus or completion of part cleaning control.

Also, maintenance execution result information indicating whether the maintenance work stored in the scheduler has been performed and maintenance reflection result information indicating whether maintenance control and processing stored in the apparatus (image forming apparatus 102) have been performed, may be obtained and used for display. The information is accurately collected and supplemented as the maintenance reflection result.

In step S2, the device information notification unit 22 notifies the server 101 of the job information, the error information, the maintenance information, and the setting change information detected by the image forming apparatus 102 in association with the detection time and the identification information of the image forming apparatus 102. The image forming apparatus 102 may notify the server 101, or the image forming apparatus 102 may notify in response to an inquiry from the server 101.

In step S3, the device information acquisition unit 13 of the server 101 receives the job information, the error information, the maintenance information, and the setting change information, and stores the received information in the information storage unit 15 in association with the time information.

FIG. 8 is a flowchart illustrating an example of a process of detecting the setting change information and the message executed by the image forming apparatus 102 and a process of storing the information executed by the server 101. In addition, since the setting change may be set by the operator, the setting change is also acquired in the process illustrated in FIG. 8.

In step S11, the device information detection unit 21 detects the message or the setting change input from the web browser on the display 110 or the like, and the device information notification unit 22 transmits the setting change information, the message, and the input time to the server 101.

In step S12, the device information acquisition unit 13 of the server 101 receives the setting change information, the message, and the input time and stores the received information in the information storage unit 15 in association with the time information.

Figure 9:
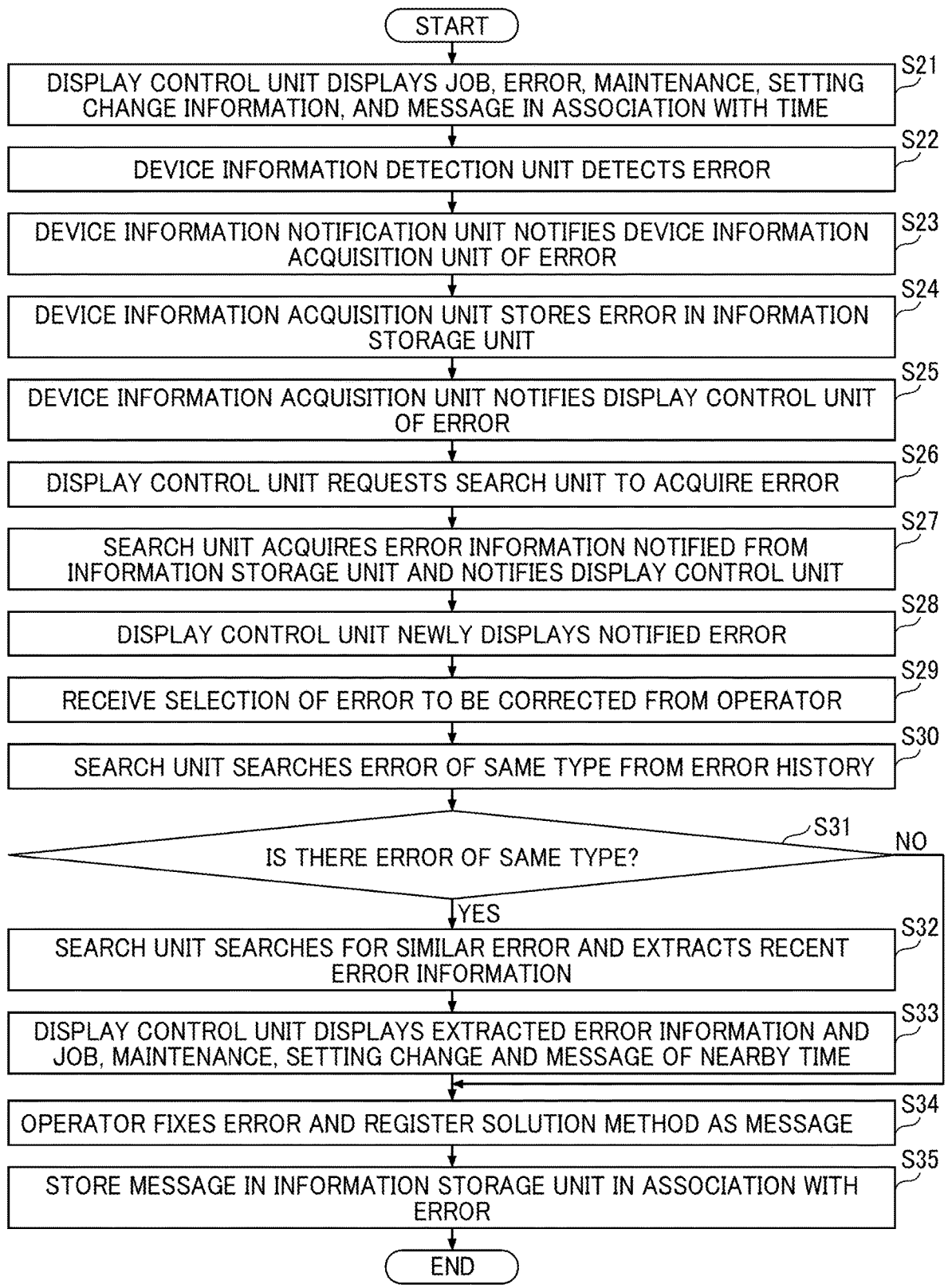
FIG. 9 is a flowchart illustrating an example of a process in which the server searches for the error information stored in an information storage unit and displays the timeline screen in response to a detection of an error.

With reference to FIG. 9, a process executed in response to the detection of the error, based on the information stored in the information storage unit 15 is described. FIG. 9 is a flowchart illustrating an example of a process in which the server 101 searches for the error information stored in the information storage unit 15 and displays on the display the timeline screen 500 in response to the detection of the error. Note that FIG. 9 illustrates a case where the display 110 of the image forming apparatus 102 presents the solution method when the error occurs.

The operator operates the web browser on the image forming apparatus 102 (or the terminal device) to request the server 101 to display the timeline screen. In step S21, the display control unit 12 acquires the past job information, the error information, the maintenance information, the setting change information, and the message for at least one screen from the current time from the information storage unit 15, and displays the timeline screen 500 on the display 110. Note that this display process may be performed as a preparatory step prior to the occurrence of an error, or may be performed when the display 110 or the image forming apparatus 102 is activated, to display the timeline screen in advance. Each piece of information includes at least generation time of the information (occurrence time, execution time, etc.) and content of the information. As illustrated in FIGS. 1 and 2, each piece of information is displayed in a row, and the content of each piece of information is displayed in chronological order in association with the time zone (time) on the horizontal axis.

In addition to the timeline screen 500, the web browser displays various applications such as the maintenance schedule and a device status dashboard. The timeline screen 500 may be displayed on a top screen (home screen) when the operator accesses the server 101, or may be displayed by switching between tabs for each application (function).

In step S22, the device information detection unit 21 detects an error such as a paper jam that occurred during the job. In step S23, the device information notification unit 22 notifies the server 101 of the error information.

The device information acquisition unit 13 acquires the error information. In step S24, the device information acquisition unit 13 updates the job information, the error information, the maintenance information, the setting change information, and the message in response to the occurrence of the error. As described above, the device information acquisition unit 13 also acquires information other than the error information. The image forming apparatus 102 notifies that the job is being executed in real time (in a few seconds interval after the job execution instruction until completion, or for each printing of one sheet).

In step S25, the device information acquisition unit 13 notifies the display control unit 12 of the occurrence of a new error.

In response to the notification, the display control unit 12 requests the search unit 14 to acquire new error information in step S26.

In response to the request, the search unit 14 acquires the new error information from the information storage unit 15 and notifies the display control unit 12 in step S27. The new error information may be the error information with the latest associated time information.

The display control unit 12 updates and stores the screen information of the timeline screen 500 including the new error information, and transmits the screen information to the image forming apparatus 102. In step S28, the image forming apparatus 102 displays the updated timeline screen on the display 110. Either the server 101 or the terminal device 103 may display the timeline screen 500.

The operator selects an error (for example, the new error) for which the operator wants to know how to solve, on the timeline screen 500. In step S29, the operation reception unit 11 identifies the error information from the pressed position on the timeline screen 500, and receives selection of the error information.

In step S30, the search unit 14 searches for an error of the same type as the selected error from the error information stored in the information storage unit 15. The search unit 14 searches in the following procedure.

(i) The search unit 14 searches in the same category (here, the error information) from the categories of the job information, the error information, the maintenance information, the setting change information, and the message.

(ii) In the case of searching for the error information, the search unit 14 searches for the error of the same type using the content of the error as a key, such as a paper jam during printing, out of paper, device failure, or parts replacement. For example, when searching for the error such as the paper jam, the search unit 14 may search using more detailed keys such as location of occurrence, paper name (size), paper type, and the like.

At this time, error information in which the message is present within the predetermined time from the occurrence time of the error of the same type is searched. The predetermined time may be, for example, one hour.

(iii) Furthermore, the search unit 14 may search for the most recent error information on the time axis, with respect to the error information received by the operation reception unit 11. This is because errors of the same type tend to occur continuously, and the solutions are often the same.

In the case the error of the same type is present (Yes in S31), the search unit 14 narrows down and extracts the past error of the same type in order closer to the current time in step S32.

In step S33, the display control unit 12 displays on the display 110, the rectangular mark 510, the error icon 511, the bar 512, and the message mark 513 for each piece of information associated with the time information for one screen based on the time associated with the extracted error information. The one screen corresponds to the time range set by the display period setting scale 514 of the timeline screen 500. In the case the extracted error information is arranged at the center of the timeline screen 500 and the time range is set to 12 hours, each information for 6 hours before and after the time information associated with the extracted error information is acquired.

By redisplaying the timeline screen 500, the timeline screen 500 being displayed in step S28 scrolls horizontally so as to go back to the timeline screen including the time information (past) associated with the error information matching the search. Alternatively, the screen is switched to the timeline screen including the time information without scrolling. In one example, the display control unit 12 may display the extracted error at the center of the screen. In another example, in the case the time information of the extracted error is, for example, between 13:00 and 14:00, the color of time range from 13:00 to 14:00 (vertically elongated area) may be changed. As described above, the operator is able to display the solution method of the error with one operation. Note that the display control unit 12 may display a list of error information matching the search on another screen.

The operator checks the message containing the error information matching the search and the solution method of the error and solves the error. In step S34, after solving the new error, the operator inputs the solution method as a message in a message input field (window) described below. Alternatively, the operator does not enter the message provided that the error of the same type has already been solved and the message has already been entered.

In the case the error of the same type does not match the search, or in the case the error of the same type matches the search but there is no error with a message within the predetermined time from the occurrence time of the error of the same type (No in S31), the display control unit 12 may display the message input field (window) to be described below in which the message is to be input. As a result, the operator is prompted to input the message in the case there is no error of the same type, or in the case there is no message within the predetermined time even when there is the error of the same type.

In step S35, the display control unit 12 stores the newly input message in the information storage unit 15 in association with the input time. As a result, searching of the error information by the server 101 is facilitated.

As described above, along with the display of the error on the timeline screen 500, the server 101 displays the solution method of the related past error. Since the timeline screen 500 displays the job information and the setting change information in addition to the past errors of the same type and the message, related information such as the cause of the error is presented collectively and simply.

Figure 10:
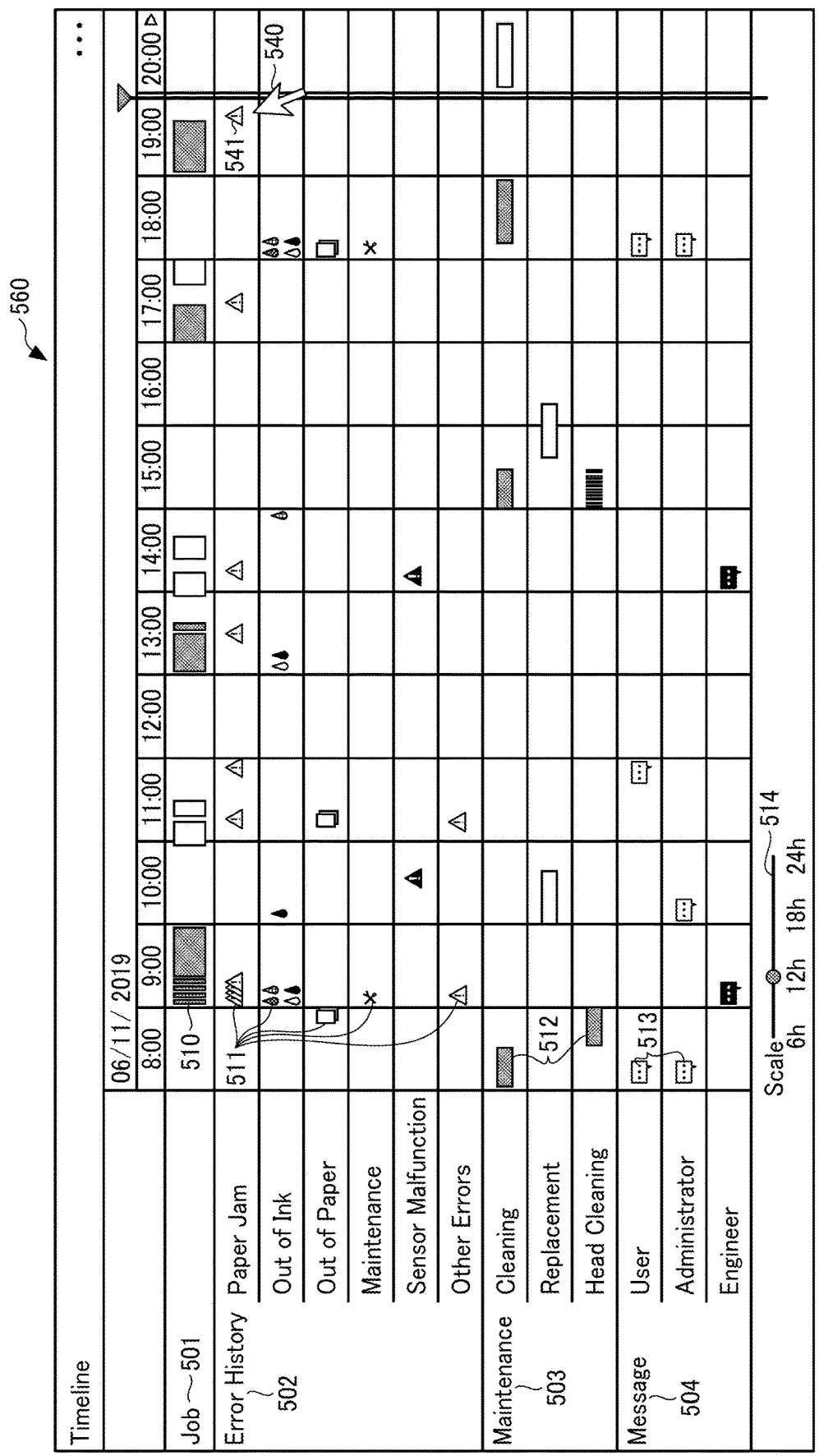
FIG. 10 is a diagram illustrating an example of the timeline screen reflecting the error that occurred on a certain date and time.
Figure 11:
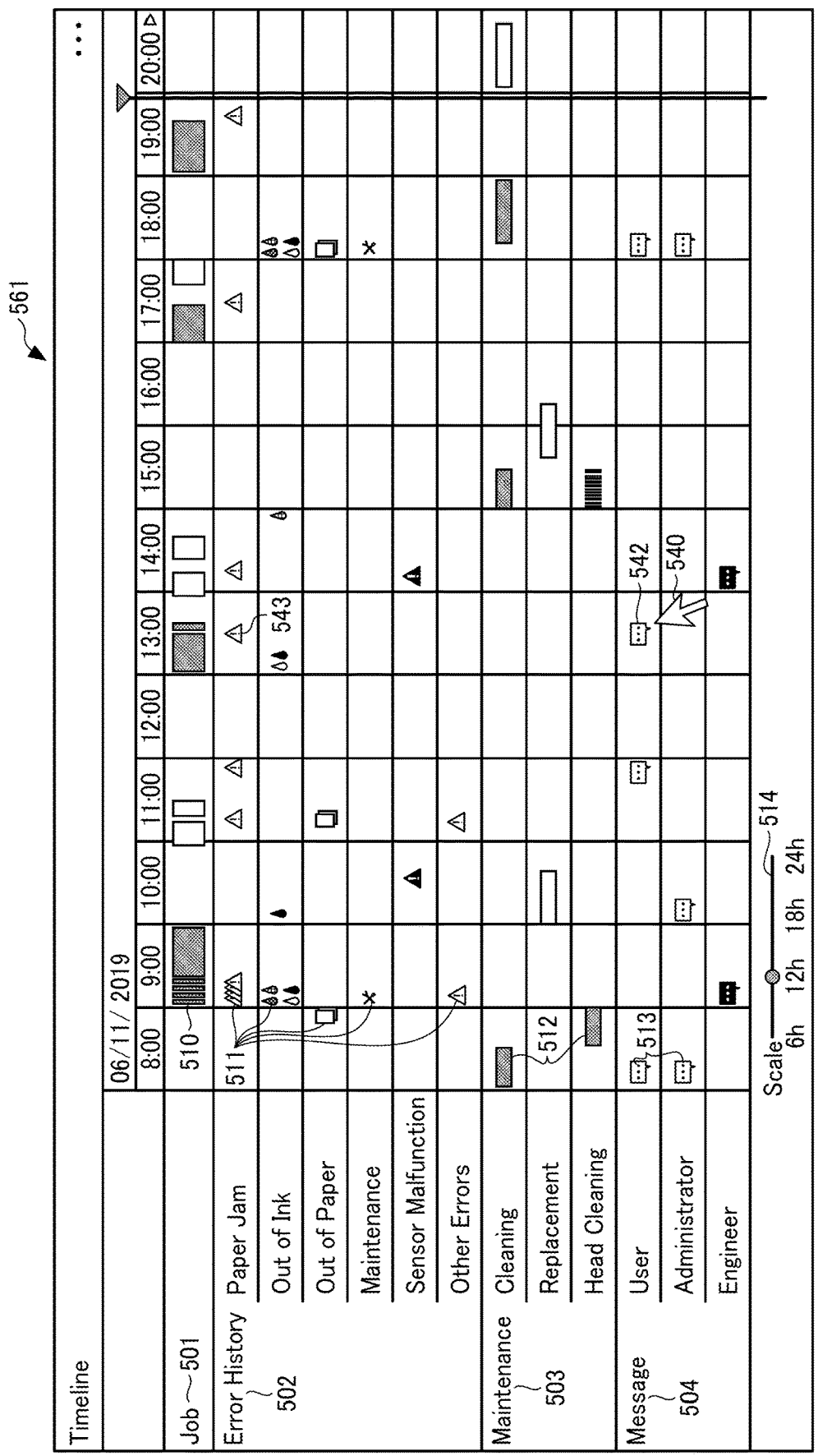
FIG. 11 is a diagram illustrating an example of the timeline screen near the time when the error of the same type as a paper jam occurred on Jun. 11, 2019.
Figure 12:
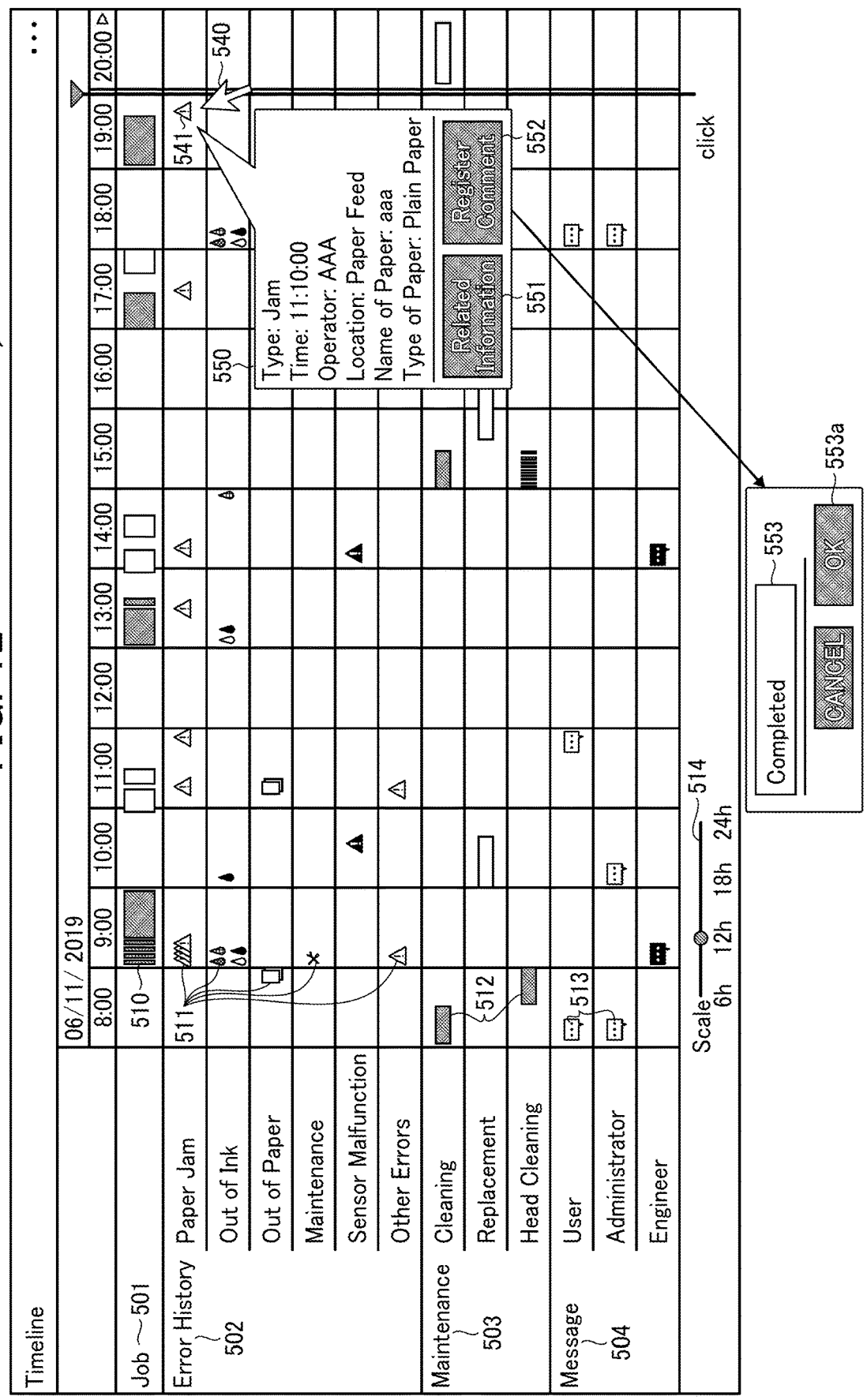
FIG. 12 is a diagram illustrating an example of the timeline screen near current time.

With reference to FIGS. 10 to 12, transition of the timeline screen initiated by the occurrence of error is described.

FIG. 10 is a diagram illustrating an example of the timeline screen 560 reflecting the error that occurred on a certain date and time. An icon 541 in FIG. 10 indicates that a paper jam occurred before 20:00 on Jun. 11, 2019.

The operator clicks or taps on the icon 541. In FIG. 10, the icon 541 is clicked with a mouse pointer 540.

The following description is based on an assumption that the error of the same type as the error that occurred matches the search, and that there is a message within the predetermined time from the error of the same type. In this case, the timeline screen 560 transitions to the time zone in which the error of the same type occurred.

FIG. 11 is a timeline screen 561 near the time when the error of the same type with the paper jam occurred on Jun. 11, 2019. The search unit 14 searches the information storage unit 15 for paper jams of the same type based on the paper jam that occurred before 20:00 on Jun. 11, 2019. The error information of the paper jam with the occurrence location, paper name, and paper type matching the paper jam that occurred before 20:00 on Jun. 11, 2019, matches the search. Furthermore, the search unit 14 searches paper jams of the same type for which the message (solution method) is stored within the predetermined period of time.

In the timeline screen 561 of FIG. 11, the paper jam at 13:30 on Jun. 11, 2019, matches the search. An icon 543 corresponds to this paper jam. The display control unit 12 displays the icon 543 corresponding to the error information at 13:30 on Jun. 11, 2019, at the center of the screen, and also displays other display objects for one screen around that time. Note that the display of the icon 543 at the center of the screen is an example. Alternatively, the display control unit 12 may simply display on the display 110, the paper jam at 13:30 on Jun. 11, 2019.

The display control unit 12 preferably display with emphasis a message mark 542 indicating the message stored within the predetermined time period from 13:30 on Jun. 11, 2019. In one example, the display control unit 12 may blink, display in a large size, or circle in red, the message mark 542. In another example, area between 13:00 and 14:00 may be displayed in a color different from other areas.

The operator clicks or taps the message mark 542 within the predetermined time from 13:30 on Jun. 11, 2019. Accordingly, the solution method to solve the error of the same type is displayed. The operator solves the error referring to the solution method.

In addition, the display control unit 12 may display without clicking or tapping, the message (solution method) of the message mark 542 within the predetermined time period from 13:30 on Jun. 11, 2019, which matches the search. Accordingly, the message (solution method) of the message mark 542 is displayed immediately after the timeline screen 561 of FIG. 11 is displayed.

Also, the timeline screen 560 in FIG. 10 may transition to the timeline screen 561 in FIG. 11 without clicking or tapping the icon 541. Specifically, in response to a detection of the error, the search unit 14 automatically searches for the error of the same type, and the display control unit 12 displays the timeline screen 561 of FIG. 11.

On the timeline screen 560 in FIG. 10, a case where the error of the same type as the error that occurred does not match the search, or a case where the search matches but the message is not stored within the predetermined time from the error of the same type is described. In these cases, the timeline screen 560 does not transition.

FIG. 12 is an example of the timeline screen 560 near the current time. In response to a click or tap on the icon 541 in FIG. 10 by the operator, a detailed information display field 550 is popped up. The detailed information display field 550 includes a related information button 551 and a comment registration button 552. In response to pressing of the comment registration button 552 by the operator, a message input field 553 is displayed to enable the operator to input a solution method as the message.

The operator may be able to display the detailed information display field 550 by performing a specific operation, even when the error of the same type as the error that occurred matches the search and the message is stored within a predetermined time after the error of the same type.

The related information button 551 is, for example, a button for searching for the error of the same type by setting or changing (easing, for example) search conditions. As a result, the operator is facilitated to view related information, including the message.

Alternatively, in response to the click or tap on the icon 541 on the timeline screen 560 of FIG. 10 by the operator, the detailed information display field 550 may be displayed. The operator is able to decide whether to search for the errors of the same type as the error that occurred, after confirming the content of the error. Based on a decision to refer to the solution method of the error of the same type, the operator presses the related information button 551, and based on a decision not to refer to the solution method of the error of the same type, the search can be skipped.

The solution method input in the message input field 553 is stored in the information storage unit 15 as a message. The time information associated with the message may be the time when the error occurred or the time when an OK button 553a is pressed.

As described above, the information processing system 100 of the present embodiment displays a plurality of pieces of information such as the past job, the error information, the maintenance information, the setting change information, and the message on one screen in association with the time zone. Accordingly, in response to an occurrence of an error, the operator is able to find the same error icon 511 related to the error in the past and press the nearby message mark 513 to find out how to solve the error.

In addition, since the timeline screen 500 displays the job information and the maintenance information in addition to the past error of the same type and the message, the related information such as the cause of the error is presented collectively.

Also, in the present embodiment, in response to an occurrence of the error, the operator presses the error icon 511 of the newly occurred error to find out the solution to the error. The server 101 searches for the error of the same type (with message), and displays the error icon 511 on the timeline screen. Since the message mark 513 near the error icon 511 contains the solution method of the error, the operator is able to find out how to solve the error that has occurred.

Since the setting change information of the image forming apparatus 102 related to the error is also displayed, the operator is able to find out the setting change that is likely to lead to the error.

Also, since the past errors of the same type as the error that occurred is presented with a single operation, the time to solve the error is reduced.

In a second embodiment, a server 101 that displays with emphasis, frequently occurring errors of the same type and displays information on related image forming apparatuses 102 in chronological order on a single timeline screen is described.

Regarding the error such as paper jam that occurs in the image forming apparatus 102, sometimes the error occurs frequently after the error is solved once. This is because the operator takes an emergency response without analyzing factors that should be fundamentally eliminated. For example, with respect to a paper jam that occurs in the image forming apparatus 102, since the main cause of the paper jam is printing conditions, there are few factors to be solved regarding the image forming apparatus 102. Accordingly, identifying factors related to frequent paper jams, such as maintenance status of the image forming apparatus 102 and paper settings is difficult. However, frequent paper jams may lead to a drop in productivity.

In the present embodiment, the server 101 displays with emphasis, errors such as paper jams that frequently occur, and presents the solution method using the related information (mainly messages with solution methods input) and troubleshooting information. Since the operator is able to easily confirm the solution method, decrease in productivity due to frequent paper jams is prevented.

Note that the present embodiment is described on an assumption that the hardware configuration diagrams of FIGS. 4 and 5 described in the above embodiment are applicable.

FIG. 13 is a block diagram illustrating an example of a functional configuration of the server 101 and the image forming apparatuses 102A and 102B. In the description of FIG. 13, difference from FIG. 6 is mainly described.

The search unit 14 of the present embodiment searches the information storage unit 15 for information of the error of the same type that frequently occurs within a predetermined period. The term "within a predetermined period" refers to the display period for one screen, and "the error of the same type" refers to the error with the same error code (or the same paper jam code in the case of a paper jam). In addition, when identifying the solution method, the search unit 14 selects the message from the information of the error of the same type that frequently occurred over the predetermined period of time. The search unit 14 also refers to the job information and the maintenance information to select the solution method.

Further, as illustrated in FIG. 13, the server 101 includes a troubleshooting information storage unit 16 in the present embodiment.

FIG. 14 illustrates troubleshooting information stored in the troubleshooting information storage unit 16. FIG. 14 illustrates paper jam-related troubleshooting information among the troubleshooting information. As illustrated in FIG. 14, in the troubleshooting information storage unit 16, troubleshooting information and detailed information are associated with each paper jam code.

The paper jam code is identification information that uniquely identifies the type of paper jam. The paper jam code is mainly determined by a place of occurrence (the position on the path from the paper feed tray to the paper output tray through several transport rollers). The place of occurrence is identified by a sensor on the path for detecting the paper. Furthermore, in the case print settings (paper size, etc.) and the job information includes common paper jam items, paper jam codes may be subdivided.

The countermeasure information is a method for clearing a paper jam corresponding to the paper jam code. The countermeasure information may be displayed in the detailed information displayed in a pop-up.

The detailed information indicates detailed information for clearing the paper jam corresponding to the paper jam code, for example, by a uniform resource locator (URL). The detailed information is, for example, how to clear the paper jam by animation or video.

In the present embodiment, the job information is used to identify the solution method. With reference to FIG. 15 the job information is described. FIG. 15 is a table illustrating the job information stored in the information storage unit 15. The job information includes a file name, paper size, color or monochrome, paper feed tray, one-sided or two-sided, combined pint, and time associated with the job ID. FIG. 15 illustrates part of the job information, and general job information such as paper orientation may also be included.

Figure 16:
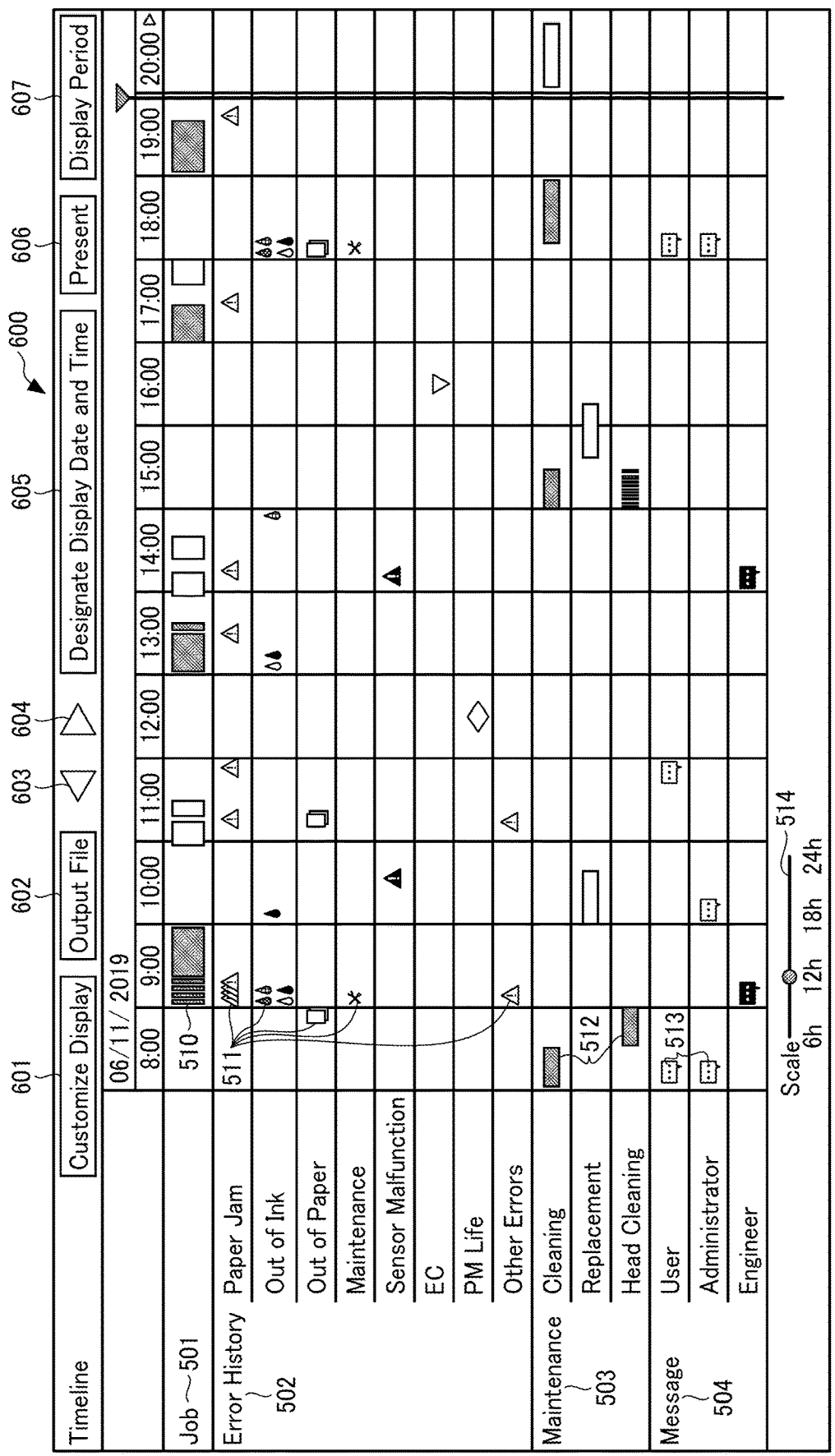
FIG. 16 is a diagram illustrating an example of the timeline screen.

FIG. 16 is a diagram illustrating an example of the timeline screen 600. Since information to be displayed on the timeline screen 600 may be changed according to policies and preferences, FIG. 16 is merely an example. In the description of FIG. 16, differences from FIG. 11 is mainly described.

The timeline screen 600 includes a display customization button 601, a file output button 602, a back button 603, a forward button 604, a display date and time designation button 605, a present button 606, and a display period button 607.

The display customization button 601 is a button for the operator to customize the items to be displayed among the job row 501, the error history row 502, the maintenance row 503, and the message row 504 on the vertical axis, and the default display period for one screen.

The file output button 602 is a button for the operator to output the contents of the timeline screen 600 to a portable document format (PDF) file or the like.

The back button 603 is a button for the operator to display a previous timeline screen 600 for one screen.

The forward button 604 is a button for the operator to display a following timeline screen 600 for one screen.

The display date and time designation button 605 is a button for the operator to display the timeline screen 600 in which the operator designates a date and time and displays the designated date and time near the center of the screen.

The present button 606 is a button for the operator to display the timeline screen 600 with the current date and time arranged at the right end (or near the center).

The display period button 607 is a button for the operator to display the timeline screen 600 for any one day, one week, one month, or any period. For example, the operator uses the display period button 607 to set the display period for checking frequency of the paper jams.

Figure 17B:
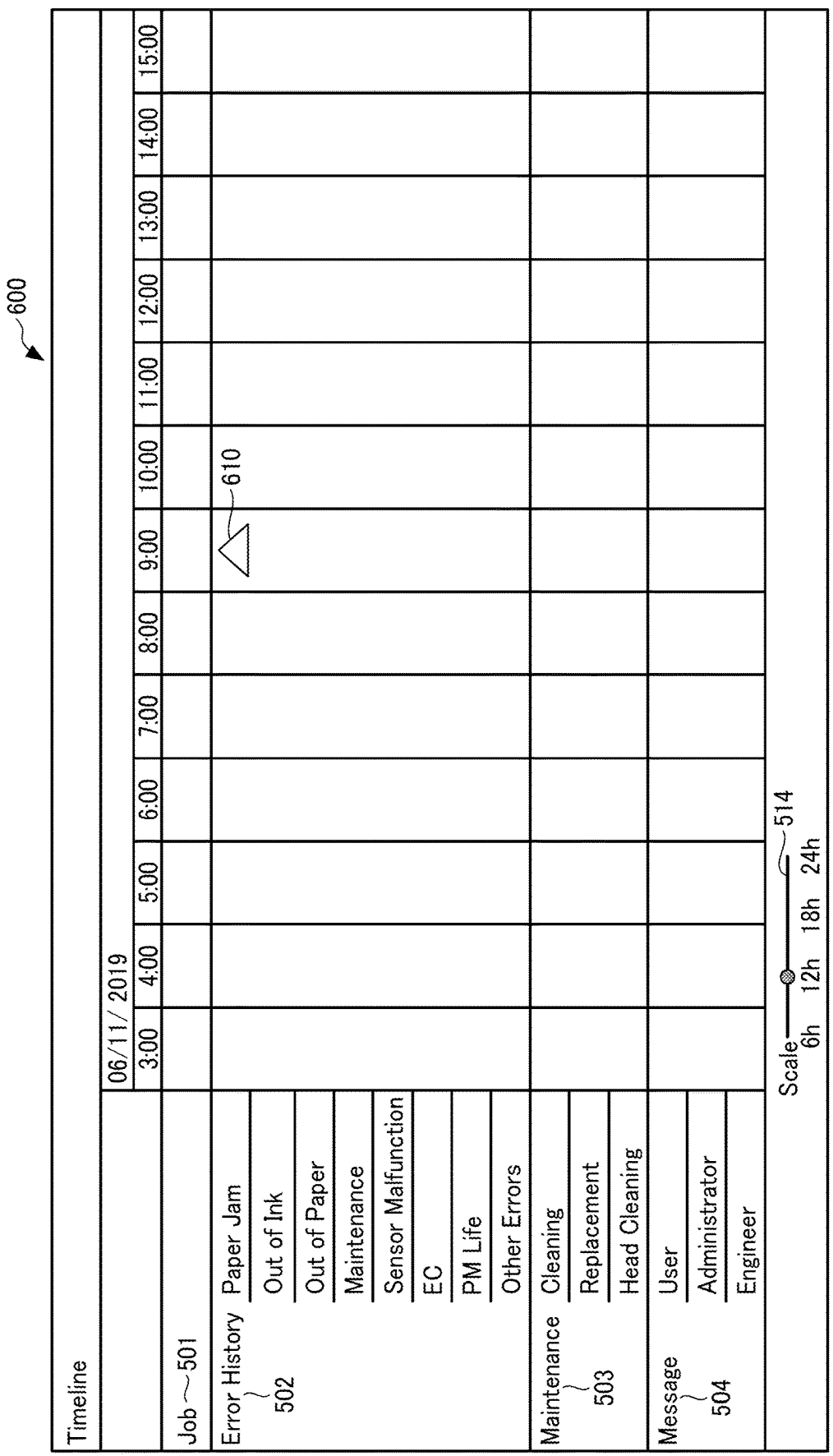

As illustrated in FIGS. 17A and 17B, in response to a pressing of a paper jam icon 610 on the timeline screen 600 by the operator, the paper jam icon 610 is arranged at the center of the timeline screen 600. FIG. 17A illustrates the paper jam icon 610 before being pressed, and FIG. 17B illustrates the paper jam icon 610 displayed after being pressed. Although other icons are omitted in FIG. 17 for convenience of description, the icons are displayed in the maintenance row 503 and the message row 504 as in FIG. 16.

The paper jam icon 610 pressed in FIG. 17A is displayed between 9:00 and 10:00. In response to pressing of the paper jam icon 610, the display control unit 12 arranges the paper jam icon 610 at the center of the timeline screen 600. In FIG. 17B, time zone 9:00 to 10:00 is moved to the center of the timeline screen 600, and the paper jam icon 610 is also displayed between 9:00 and 10:00. The operator is facilitated to find the paper jam icon 610 that the operator pressed.

In FIG. 17B, the display period for one screen may be the same as before the operator presses the paper jam icon 610, or may be switched to the default display period.

Figure 18:
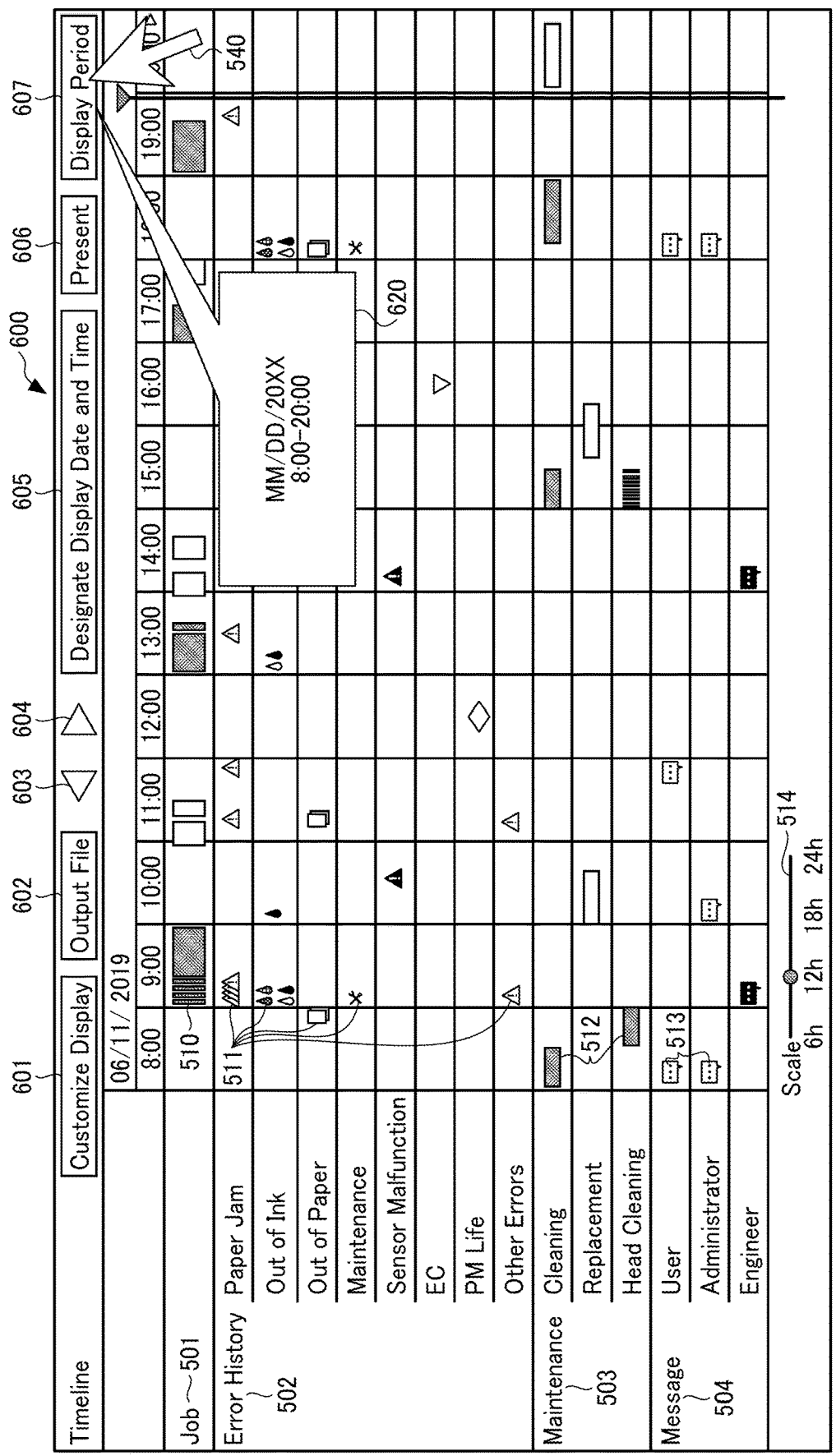
FIG. 18 is a diagram illustrating an example of the timeline screen with a display period button pressed.

With reference to FIG. 18, designation of the display period by the operator is described. FIG. 18 is an example of the timeline screen 600 with the display period button 607 pressed. In response to a pressing of the display period button 607, a date and time setting field 620 is displayed. The operator sets any one day, one week, one month, date range, date and time range, or the like in the date and time setting field 620. The date and time setting field 620 may include a button to return to the default display period. Note that a function to support input by displaying a calendar or a pull-down menu of time when inputting to the date and time setting field 620 is preferred to be available. The error and related information of the set display period are displayed in the error history row 502 by the operator setting the display period of the timeline screen 600 as described above.

A method to display the error of the same type that occurred frequently is described. In the present embodiment, several methods may be used by the server 101 to display the error of the same type that occurred frequently.

a. Designate display period.
b. Press the icon corresponding to the error.
c. Instruct to display indication of the error of the same type displayed in the menu.

The error of the same type is the errors with the same error code. In the case of the paper jam, the type of paper jam determines the paper jam code, so the error of the same type indicates that the paper jam code is the same.

In response to a changing of the display period as described in FIGS. 17A, 17B, and 18, the timeline screen 600 is updated, and the display control unit 12 determines whether the number of errors of the same type is equal to or greater than a threshold within a display period for one screen (that is, within the predetermined period), and based on a determination that the number of errors of the same type is equal to or greater than the threshold, the display control unit 12 displays with emphasis, the frequently occurring error of the same type. Although the threshold is set to "2" in the below description, the operator may be able to set the threshold. In the description below, the paper jam is described as an example of the error.

Figure 19:
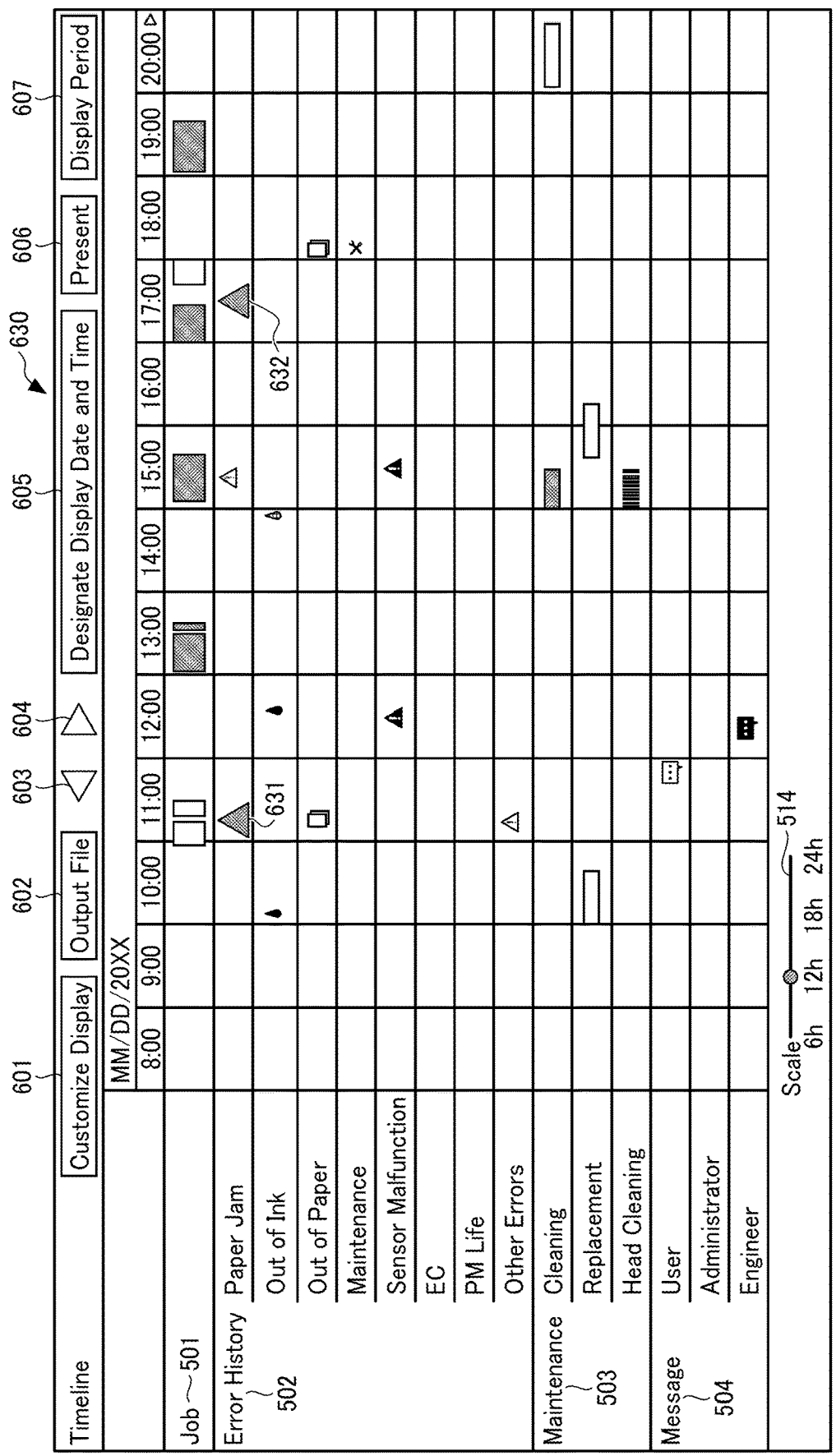
FIG. 19 is a diagram illustrating an example of the timeline screen in which icons of paper jams of the same type that frequently occur are highlighted and displayed.

FIG. 19 illustrates a timeline screen 630 in which the icons of the frequent paper jams of the same type are displayed with emphasis. The timeline screen 630 of FIG. 19 may be displayed by any of the methods a to c described above. In FIG. 19, two similar paper jam icons 631 and 632 are displayed with emphasis. Any method of emphasizing may be used. For example, the display control unit 12 may display the paper jam icons 631 and 632 of the same type of paper jam that frequently occurs in a color such as red that is highly alert (the same color for each type of error). Alternatively, the display control unit 12 may blink the paper jam icons 631 and 632. The operator can easily notice that there are frequent paper jams of the same type.

In response to pressing one of the paper jam icons 631 and 632, the detailed information of the paper jam is popped up. Furthermore, in response to pressing the related information button 551, the solution method for the error is displayed. There are two ways to display the solution method.

(i) As in the first embodiment, a message entered within the predetermined time (within the predetermined time from the occurrence of the error) for the paper jam of the same type as the paper jam of the icon whose related information button 551 was pressed, is displayed. The displayed message includes the solution method for the paper jam.

(ii) The countermeasure information associated with the paper jam code of the paper jam icon for which the related information button 551 was pressed is displayed. The displayed countermeasure information includes the solution method.

The display control unit 12 may display at least one of (i) or (ii).

FIG. 20 illustrates an example of the detailed information 635 and the solution method displayed on the timeline screen 630. The detailed information 635 is displayed in response to the pressing or mouse over of the emphasized paper jam icon 632. The contents of the detailed information 635 may be the same as in the first embodiment. In the present embodiment, by pressing the related information button 551, the solution method of the paper jam is displayed. In FIG. 20, the solution method 636 for solving frequently occurring paper jam of the same type displayed based on the message described in (i) is displayed. "Right drawer unit insufficient cleaning" is displayed as the solution method 636. The operator solves the paper jam by referring to the solution method.

Note that the message (solution method 636) displayed in FIG. 20 is not limited to the message input within the predetermined time for the same type of paper jam displayed in one screen. Multiple messages may be extracted because the error of the same type occurred frequently. In this case, the display control unit 12 may display all the messages (the same or similar messages may not be displayed), or may display the message within the predetermined period of time from the paper jam of the same type that is closest to the pressed paper jam icon 632. In the case all messages are extracted, the search unit 14 may identify the message with the largest number of identical or similar messages.

Alternatively, the search unit 14 may refer to the job information, detect a piece of job information similar to the job information that caused the paper jam whose paper jam icon 632 was pressed, and identify the message to be displayed. For example, assume that the job information that caused the paper jam for which the paper jam icon 632 was pressed is as follows. The job information that caused the paper jam is the job that was being executed at the time the error occurred.

Paper size: A4
Color/Monochrome: Monochrome
Paper tray: Tray 1
Double-sided/Single-sided: Double-sided
Combined printing: No In the case a plurality of messages are extracted for the paper jam of the same type as the paper jam of the pressed paper jam icon 632, the search unit 14 detects the job information with the largest number of matching job information items, and identify the message associated with the paper jam. As a result, the solution method of the paper jam that occurred with the similar job information is displayed in addition to the solution method of the paper jam of the same type.

Although the paper jam icon 632 is pressed in FIG. 20, the same applies when the paper jam icon 631 is pressed. In response to the pressing of the paper jam icon 631, the message stored within the predetermined period of time from the error information of the paper jam icon 632 may be displayed.

Figure 21:
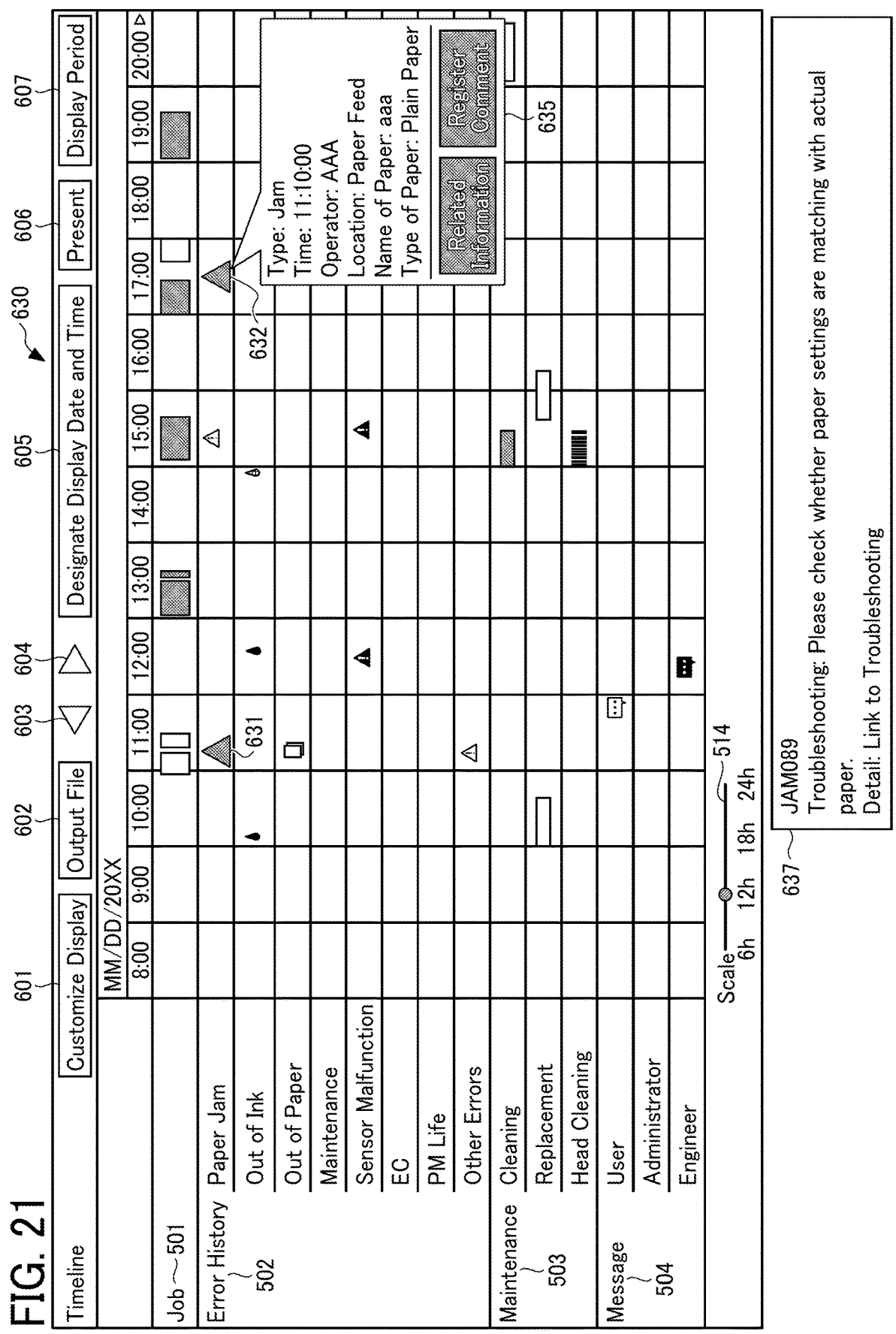
FIG. 21 is a diagram illustrating another example of the detailed information and the solution method displayed on the timeline screen.

FIG. 21 illustrates an example of the detailed information and the solution method displayed on the timeline screen 630. In FIG. 21, a solution method 637 included in the countermeasure information associated with the paper jam code described in (ii) is displayed. As the solution method 637, "Please check whether paper settings are matching with actual paper." is displayed. Further, the solution method 637 displays the detailed information (link destination) of the troubleshooting information. The operator may refer to the solution method 637 to perform troubleshooting.

A case in which a plurality of pieces of countermeasure information are associated with one troubleshooting is described. For example, a certain paper jam code is associated with the following two pieces of countermeasure information.

1. Make sure that the actual paper and paper settings match.
2. Please check the maintenance status.

The display control unit 12 may display two pieces of countermeasure information. However, there are cases where one or more pieces of countermeasure information are associated with one paper jam code, and the operator may find difficulty in checking all the countermeasure information in order. The display control unit 12 is preferred to display more appropriate countermeasure information as a fundamental solution.

In the present embodiment, the search unit 14 identifies the appropriate countermeasure information based on the job information and the maintenance information in the maintenance row 503. Regarding the paper jam of the same type as the paper jam for which the paper jam icon 632 was pressed, the search unit 14 determines to display the countermeasure information 2 described above in the case there is no record of maintenance performed in a certain amount of time before the paper jam. This is because there is a high possibility that the paper jam occurred due to lack of maintenance. The certain amount of time before the paper jam is, for example, 12 to 24 hours, which may be set by the operator.

Regarding the job information, since the countermeasure information includes paper settings, the search unit 14 compares the paper settings of the paper jam of the same type as the paper jam for which the paper jam icon 632 was pressed, and of the job information of job being executed when the paper jam whose paper jam icon 632 was pressed occurred. The paper settings include, for example, paper size, paper feed tray, print orientation (portrait or landscape), and the like. Regarding the paper settings, in the case items equal to or greater than the threshold are the same (when the degree of similarity of the paper settings is equal to or greater than the threshold), the search unit 14 determines to display the countermeasure information 1 described above. This is because in the case the paper settings are similar and the same paper jam occurs, the paper settings are likely to be the cause of the paper jam.

For example, in the case the countermeasure information is "Please check the type of toner that is set", since the countermeasure information includes toner, the search unit 14 searches for the paper jam of the same type as the paper jam for which the paper jam icon 632 was pressed, and checks whether special toner is used for the job in the job information generated during execution of the job in which the paper jam whose paper jam icon 632 was pressed occurred. This is because in the case the same paper jam occurs depending on the toner used, the toner is likely the cause of the paper jam.

As described above, the server 101 of the present embodiment presents the solution method for solving the same type of paper jam even when the plurality of pieces of countermeasure information is associated with the troubleshooting information.

Although cases where the countermeasure information including the paper settings and the toner settings are described here, the countermeasure information may include print settings other than the paper settings and toner settings. The print settings may be the same as the job information.

Figure 22:
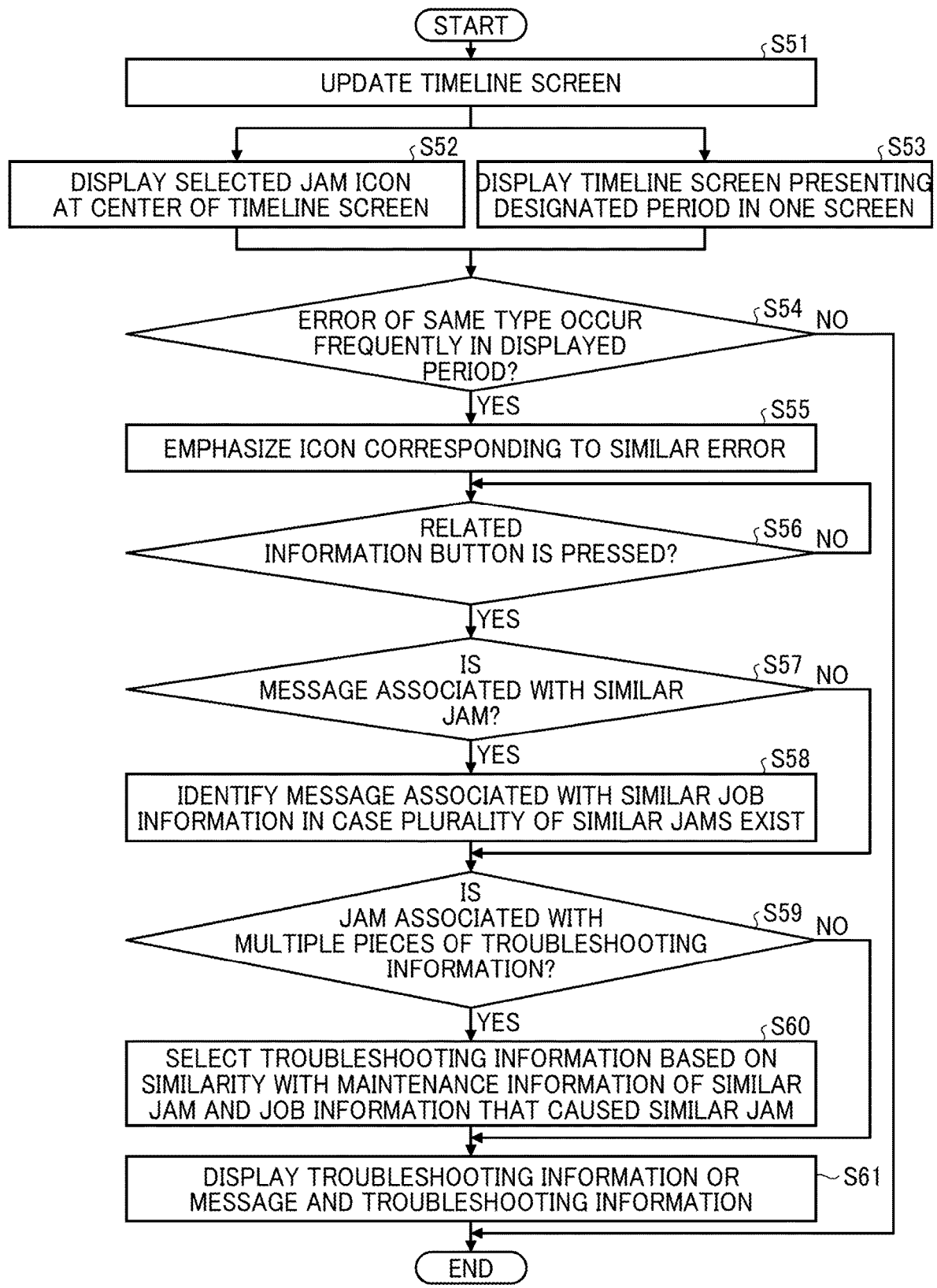
FIG. 22 is a flowchart illustrating an example of a display process of the timeline screen in which the server emphasizes and displays frequently occurring errors of the same type and displays the solution method.

FIG. 22 is a flow chart illustrating an example of a display process of the timeline screen in which the server 101 displays with emphasis, frequently occurring errors of the same type and displays the solution method. In the description of FIG. 22, a paper jam is described as an example of the error.

In step S51, the operator updates the timeline screen 600. The methods for updating the timeline screen 600 include the methods a to c described above.

In response to a pressing of the paper jam icon 610, the display control unit 12 arranges the selected paper jam icon 610 at the center of the timeline screen 600 and displays the timeline screen 600 in step S52.

In response to a designation of the display period, the display control unit 12 displays the timeline screen 630 presenting the designated display period as one screen in step S53.

In the display of steps S52 and S53, the search unit 14 determines whether there is an error of the same type that occurs frequently within one screen in step S54. The search unit 14 searches the information storage unit 15 for paper jams that occurred during the display period of the timeline screen and have the same paper jam code.

In the case the determination in step S54 is Yes, the display control unit 12 displays with emphasis, the paper jam icons 631 and 632 corresponding to the paper jams of the same type in step S55. Two or more paper jams of the same type are sufficient as the paper jam of the same type that occurs frequently. Also, when there are different types of errors of the same type that occur frequently (such as paper jams A1 and A2, and paper jams B1 and B2), the display control unit 12 may emphasize the paper jam icons of the same type with the largest number, or may emphasize each icon in a different color. The display control unit 12 may color-code the most common item in red (warning color), the next most common item in orange, and the next most common item in yellow.

In step S56, the operation reception unit 11 determines whether the detailed information 635 is displayed by pressing or mouseover of the paper jam icon 632, and whether the related information button 551 is pressed.

In response to the pressing of the related information button 551, the search unit 14 determines whether the message is associated with the paper jam of the same type as the paper jam for which the related information button 551 was pressed in step S57. This is because there is a high possibility that the error of the same type is solved in the case the messages are associated. The message associated with a paper jam is a message input within the predetermined period of time from the occurrence of the paper jam.

Further, when there are a plurality of paper jams of the same type associated with the message, the search unit 14 retrieves the job information that caused the paper jam for which the related information button 551 was pressed, and the message associated with the similar job information is identified in step S58. As a result, in addition to the paper jam of the same type the paper jams that occurred with similar job information are identified, to facilitate identification of the message including solution method of the paper jam for which the related information button 551 was pressed.

In step S59, the search unit 14 determines whether a plurality of countermeasure information are associated with the paper jam for which the related information button 551 is pressed. Since a paper jam code has already been identified due to the paper jam, at least one piece of countermeasure information is associated with the paper jam code in the troubleshooting information storage unit 16. However, like other paper jams, there may be paper jams that are not associated with the countermeasure information. In this case, the countermeasure information is not referenced.

In the case the determination in step S59 is Yes, and the countermeasure information includes the term "maintenance", the search unit 14 selects the countermeasure information based on the maintenance information related to the paper jam of the same type as the paper jam for which the related information button 551 is pressed in step S60. In the case there is no record of maintenance performed for the paper jam of the same type as the paper jam for which the related information button 551 was pressed for the certain period of time before the paper jam, the search unit 14 determines to display the countermeasure information related to the maintenance.

In addition, the search unit 14 determines the similarity of the job information of the paper jam of the same type as the paper jam for which the related information button 551 was pressed, with respect to the print settings (for example, paper settings) included in the countermeasure information.

The search unit 14 selects countermeasure information depending on whether the degree of similarity is equal to or greater than a threshold. The process described above increases the possibility of displaying the fundamental solution method for solving the paper jam.

In step S61, the display control unit 12 displays the message and the countermeasure information, or just the countermeasure information around the detailed information 635. The operator may be able to display both the message and the countermeasure information, or display available information by pressing the related information button 551. Further, instead of the related information button 551, the display control unit 12 may display a message button or a troubleshooting button in the case corresponding information is available, or may gray out buttons without corresponding information.

In FIG. 22, subsequent processing is executed in the case the error of the same type occurred frequently within the display period, but the solutions illustrated in FIGS. 20 and 21 may be displayed in the case the error of the same type did not occur frequently.

In addition to the effects of the first embodiment, the information processing system 100 of the present embodiment displays with emphasis, the frequently occurring paper jams, presents the troubleshooting and solution method (messages) that solved the errors in the past, and prevents decrease in productivity due to the frequent paper jams.

For example, the operator can easily check the past paper jam status and review the paper jam related settings and cleaning between the jobs, which improves the productivity of printing. Note that the operator may perform the error display of the present embodiment immediately after the error occurs.

Although the best mode for carrying out the present disclosure has been described using the examples described above, the present disclosure is not limited to these examples, and various modifications and substitutions can be made without departing from the scope of the present disclosure.

For example, although the image forming apparatus 102 uses a general-purpose web browser, a dedicated application may be used for the timeline screen.

Also, the timeline screen 500 may arrange the job row 501, the error history row 502, the maintenance row 503, and the message row 504 in the horizontal direction, and a time zone (time axis) arranged in the vertical direction.

In addition, in the first embodiment, the error of the same type as the selected error information is retrieved, but the job of the same type as the selected job information, the maintenance information of the same type as the selected maintenance information, the setting change information of the same type as the selected setting change information and messages of the same type as the selected message can be retrieved. The same type may be similarities, and may be determined by machine learning, Term Frequency-Inverse Document Frequency (TF-IDF), or the like.

Further, in the second embodiment, the frequently occurring paper jams are displayed with emphasis, and the solution methods (messages) for paper jams in the past and troubleshooting information are presented. However, frequent errors are not limited to the paper jams, and can also be applied to out of ink, out of paper, sensor malfunction, and other errors.

The examples of configuration illustrated in FIG. 6 and the like are divided according to main functions in order to facilitate understanding of processing by the server 101 and the image forming apparatus 102. The present disclosure is not limited by the method and name of division of processing units. The processing of the server 101 and the image forming apparatus 102 can also be divided into more processing units according to the content of the processing. Further, one process may be divided to include a larger number of processes.

The apparatuses or devices described in one or more embodiments are just one example of plural computing environments that implement the one or more embodiments disclosed herein. In some embodiments, the server 101 includes multiple computing devices, such as a server cluster. The plurality of computing devices is configured to communicate with one another through any type of communication link, including a network, shared memory, etc., and perform the processes disclosed herein.

Further, the server 101 can be configured to share the disclosed processing steps, for example, the flowcharts of FIGS. 7, 8, and 9 in various combinations. For example, a process executed by a given unit may be executed by a plurality of information processing apparatuses included in the server 101. Further, the server 101 may be integrated into one server or may be divided into a plurality of devices.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In a first aspect, an information processing system includes a device and an information processing apparatus communicably connected with the device. The information processing apparatus includes a device information acquisition unit that stores in an information storage unit error information acquired from the device, and information on a solution method of an error input to the device or the information processing apparatus in association with time information, and a display control unit that displays presence of the error information and presence of the solution method in association with time axis based on the time information.

In a second aspect, the information processing system of the first aspect further includes a search unit that searches the information storage unit for an error of the same type as the error information in response to selection of a display component indicating presence of the error information, and the display control unit that displays the error information associated with the error of the same type that matches the search for one screen including the time information and the presence of the solution method, in association with the time axis based on the time information.

In a third aspect, in the information processing system according to the second aspect, the device information acquisition unit acquires from the device, job information indicating a job executed by the device, maintenance information indicating maintenance performed on the device, and setting change information indicating a setting change made on the device and the display control unit displays the presence of the solution method, the presence of the job information, the presence of the maintenance information, and information indicating change in the setting change information of the device, in association with the time axis, based on the time information corresponding to each item of the error information associated with the error of the same type including time information for one screen.

In a fourth aspect, in the information processing system according to the third aspect, the device information acquisition unit acquires a result of maintenance reflection stored in the device and a result of maintenance execution stored in a scheduler as the maintenance information.

In a fifth aspect, in the information processing system according to any one of the second aspect to the fourth aspect, the search unit searches a most recent error information for the selected error information, among the errors of the same type as the selected error information.

In a sixth aspect, in the information processing system according to any one of the second aspect to the fourth aspect, the search unit searches for the error of the same type as the error of the selected error information and for which the solution method is present within a predetermined time from a time indicated by the time information associated with the error of the same type.

In a seventh aspect, in the information processing system according to the sixth aspect, the display control unit displays on the display with emphasis, the presence of the solution method within the predetermined time from the time indicated by the time information associated with the error of the same type.

In an eighth aspect, in the information processing system according to any one of the second aspect to the seventh aspect, in response to receiving selection of the display component indicating the presence of the error information, the display control unit displays on the display, a message input field and stores in the information storage unit, the information input by an operator in the message input field as the solution method, in association with time of input of the information or the same time information as the selected error information in the information storage unit.

In a ninth aspect, in the information processing system according to the eighth aspect, in response to receiving selection of the display component indicating the presence of the error information, the search unit searches from the information storage unit, an error of the same type as the selected error information and in a case the search for the error of the same type is unmatched, the display control unit displays on the display the message input field.

In a tenth aspect, in the information processing system according to the eighth aspect, in response to receiving selection of the display component indicating the presence of the error information, the search unit searches from the information storage unit, an error of the same type as the selected error information and in a case the search for the error of the same type is matched without the solution method stored within a predetermined time from the error of the same type, the display control unit displays on the display the message input field.

In an eleventh aspect, in the information processing system according to the first aspect, the search unit searches the information storage unit for the error information of the error of the same type that frequently occurs within a predetermined period and the display control unit displays on the display with emphasis, a display component related to the error information of the error of the same type that frequently occurs, in association with the time axis based on the time information associated with the error information.

In a twelfth aspect, in the information processing system according to the eleventh aspect, in response to receiving selection of the display component indicating the presence of the error information, the display control unit displays the selected display component indicating the presence of the error information at the center of a screen with respect to the time axis.

In a thirteenth aspect, in the information processing system according to the eleventh aspect, in response to receiving selection of a display period of one screen for displaying the error information, the display control unit displays on the display, the display component indicating the error information that occurred during the display period in association with the time axis.

In a fourteenth aspect, in the information processing system according to any one of the eleventh aspect to the thirteenth aspect, in response to receiving selection of one of a plurality of display components related to the error information of the same type that frequently occurs, the display control unit displays on the display, the solution method associated with the error information of the same type as the error information for which the selection is received.

In a fifteenth aspect, in the information processing system according to the fourteenth aspect, the device information acquisition unit acquires from the device, job information indicating a job executed by the device and in a case there are multiple pieces of the error information of the same type as the selected error information, the display control unit displays on the display, the solution method associated with the error information of the same type and further associated with the job information similar to the job information that caused the error of the selected error information.

In a sixteenth aspect, in the information processing system according to any one of the eleventh aspect to the fifteenth aspect, the device information acquisition unit acquires from the device, job information indicating a job executed by the device and maintenance information indicating maintenance performed on the device and the search unit determines troubleshooting information to be displayed on the display among one or more items of the troubleshooting information associated with selected error information stored in the troubleshooting information storage unit, based on presence or absence of maintenance within a predetermined time before the error of the same type as the error of the selected error information, or a degree of similarity of print settings included in the job information that caused the error of the same type as the error of the selected error information, with the print settings included in the troubleshooting information.

The invention claimed is:
1. An information processing system comprising:
a device; and
an information processing apparatus communicably connected with the device, the information processing apparatus including:
circuitry configured to:
store in one or more memories, error information acquired from the device and a solution method of an error input to the device or the information processing apparatus in association with time information; and
display on a display, presence of the error information and presence of the solution method in association with time axis based on the time information,
wherein the circuitry is further configured to:
in response to receiving selection of the error information by selection of a display component for indicating the presence of the error information, search the one or more memories for an error of a same type as selected error information; and
display on the display, the error information associated with the error of the same type that matches the search for one screen including the time information and the presence of the solution method, in association with the time axis based on the time information,
the circuitry is further configured to:
in response to receiving selection of the display component indicating the presence of the error information, display on the display, a message input field; and store in the one or more memories, the information input by an operator in the message input field as the solution method, in association with time of input of the information or the same time information as the selected error information, and the circuitry is further configured to:

in response to receiving selection of the display component indicating the presence of the error information, search from the one or more memories, an error of the same type as the selected error information; and in a case the search for the error of the same type is unmatched, display on the display the message input field.

2. The information processing system of claim 1, wherein the circuitry is further configured to:

acquire from the device, job information indicating a job executed by the device, maintenance information indicating maintenance performed on the device, and setting change information indicating a setting change made on the device; and display the presence of the solution method, the presence of the job information, the presence of the maintenance information, and information indicating change in the setting change information of the device, in association with the time axis, based on the time information corresponding to each item of the error information associated with the error of the same type including time information for one screen.

3. The information processing system of claim 2, wherein the circuitry is configured to acquire a result of maintenance reflection stored in the device and a result of maintenance execution stored in a scheduler as the maintenance information.

4. The information processing system of claim 1, wherein the circuitry is configured to search a most recent error information for the selected error information, among the errors of the same type as the selected error information.

5. The information processing system of claim 1, wherein the circuitry is configured to search for the error of the same type as the error of the selected error information and for which the solution method is present within a predetermined time from a time indicated by the time information associated with the error of the same type.

6. The information processing system of claim 5, wherein the circuitry is configured to display on the display with emphasis, the presence of the solution method within the predetermined time from the time indicated by the time information associated with the error of the same type.

7. The information processing system of claim 1, wherein the circuitry is further configured to:

in response to receiving selection of the display component indicating the presence of the error information, search from the one or more memories, an error of the same type as the selected error information; and in a case the search for the error of the same type is matched without the solution method stored within a predetermined time from the error of the same type, display on the display the message input field.

8. The information processing system of claim 1, wherein the circuitry is further configured to:

search the one or more memories for the error information of the error of the same type that frequently occurs within a predetermined period; and display on the display with emphasis, a display component related to the error information of the error of the same type that frequently occurs, in association with the time axis based on the time information associated with the error information.

9. The information processing system of claim 8, wherein the circuitry is further configured to, in response to receiving selection of the display component indicating the presence of the error information, display the selected display component indicating the presence of the error information at the center of a screen with respect to the time axis.

10. The information processing system of claim 8, wherein the circuitry is further configured to, in response to receiving selection of a display period of one screen for displaying the error information, display on the display, the display component indicating the error information that occurred during the display period in association with the time axis.

11. The information processing system of claim 8, wherein the circuitry is further configured to, in response to receiving selection of one of a plurality of display components related to the error information of the same type that frequently occurs, display on the display, the solution method associated with the error information of the same type as the error information for which the selection is received.

12. The information processing system of claim 11, wherein the circuitry is further configured to:

acquire from the device, job information indicating a job executed by the device; and in a case there are multiple pieces of the error information of the same type as selected error information, display on the display, the solution method associated with the error information of the same type and further associated with the job information similar to the job information that caused the error of the selected error information.

13. The information processing system of claim 8, wherein the circuitry is further configured to:

acquire from the device, job information indicating a job executed by the device and maintenance information indicating maintenance performed on the device; and determine troubleshooting information to be displayed on the display among one or more items of the troubleshooting information associated with selected error information, based on presence or absence of maintenance within a predetermined time before the error of the same type as the error of the selected error information, or a degree of similarity of print settings included in the job information that caused the error of the same type as the error of the selected error information, with the print settings included in the troubleshooting information.

14. An information processing apparatus comprising:

circuitry configured to:

communicate with a device through a network;

store in one or more memories, error information acquired from the device and a solution method of an error input to the device or the information processing apparatus in association with time information; and display on a display, presence of the error information and presence of the solution method in association with time axis based on the time information, wherein the circuitry is further configured to:

in response to receiving selection of the error information by selection of a display component for indicating the presence of the error information, search the one or more memories for an error of a same type as selected error information; and display on the display, the error information associated with the error of the same type that matches the search for one screen including the time information and the presence of the solution method, in association with the time axis based on the time information, the circuitry is further configured to:

in response to receiving selection of the display component indicating the presence of the error information, display on the display, a message input field; and store in the one or more memories, the information input by an operator in the message input field as the solution method, in association with time of input of the information or the same time information as the selected error information, and the circuitry is further configured to:

in response to receiving selection of the display component indicating the presence of the error information, search from the one or more memories, an error of the same type as the selected error information; and in a case the search for the error of the same type is unmatched, display on the display the message input field.

15. A display method comprising:

storing in one or more memories, error information acquired from a device and a solution method of an error input to the device or an information processing apparatus in association with time information; and displaying on a display, presence of the error information and presence of the solution method in association with time axis based on the time information, wherein the method further comprises:

in response to receiving selection of the error information by selection of a display component for indicating the presence of the error information, searching the one or more memories for an error of a same type as selected error information; and displaying on the display, the error information associated with the error of the same type that matches the search for one screen including the time information and the presence of the solution method, in association with the time axis based on the time information, the method further comprises:

in response to receiving selection of the display component indicating the presence of the error information, displaying on the display, a message input field; and storing in the one or more memories, the information input by an operator in the message input field as the solution method, in association with time of input of the information or the same time information as the selected error information, and the method further comprises:

in response to receiving selection of the display component indicating the presence of the error information, searching from the one or more memories, an error of the same type as the selected error information; and in a case the search for the error of the same type is unmatched, displaying on the display the message input field.

* * * * *